(12) United States Patent
Jinta et al.

(10) Patent No.: US 10,991,329 B2
(45) Date of Patent: Apr. 27, 2021

(54) CONTROL CIRCUIT, DISPLAY DEVICE, ELECTRONIC APPARATUS, AND PROJECTION DISPLAY APPARATUS

(71) Applicant: SONY CORPORATION, Tokyo (JP)

(72) Inventors: Seiichiro Jinta, Kanagawa (JP); Yoshiaki Kouyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/737,620

(22) PCT Filed: May 26, 2016

(86) PCT No.: PCT/JP2016/065609
§ 371 (c)(1),
(2) Date: Dec. 18, 2017

(87) PCT Pub. No.: WO2016/208321
PCT Pub. Date: Dec. 29, 2016

(65) Prior Publication Data
US 2018/0151138 A1    May 31, 2018

(30) Foreign Application Priority Data
Jun. 26, 2015 (JP) .............................. JP2015-128929

(51) Int. Cl.
*G09G 3/36* (2006.01)
*G09G 3/20* (2006.01)

(52) U.S. Cl.
CPC ............ *G09G 3/3674* (2013.01); *G09G 3/20* (2013.01); *G09G 3/3614* (2013.01);
(Continued)

(58) Field of Classification Search
CPC ............ G09G 3/3614; G09G 2310/08; G09G 3/3674; G09G 3/20; G09G 3/3655;
(Continued)

(56) References Cited

U.S. PATENT DOCUMENTS 5,812,210 A * 9/1998 Arai ..................... G09G 1/165
348/441
6,307,532 B1 * 10/2001 Aoki .................... G09G 3/3648
345/100

(Continued)

FOREIGN PATENT DOCUMENTS

CN    1348166 A    5/2002
CN    102906805 A    1/2013
(Continued)

OTHER PUBLICATIONS

VESA and Industry Standards and Guidelines for Computer Display Monitor Timing (DMT); Version 1.0, Rev. 13; Feb. 8, 2013; pertinent pp. 13-16.*

(Continued)

*Primary Examiner* — Michael J Jansen, II
(74) *Attorney, Agent, or Firm* — Chip Law Group

(57) ABSTRACT

A control circuit according to an embodiment of the disclosure performs control of active matrix driving by a field inversion driving method to cause a vertical effective display period in one field period to be close to a start time of the one field period upon observation of a waveform of a signal outputted from the control circuit with display resolution of 200 μsec or display resolution lower than display resolution of 200 μsec. The one field period is defined by a vertical start signal.

11 Claims, 41 Drawing Sheets

(52) U.S. Cl.
CPC ......... *G09G 3/3648* (2013.01); *G09G 3/3655* (2013.01); *G09G 3/3688* (2013.01); *G09G 3/3696* (2013.01); *G09G 2310/0297* (2013.01); *G09G 2320/0214* (2013.01)

(58) Field of Classification Search
CPC .. G09G 3/3688; G09G 3/3648; G09G 3/3696; G09G 2320/0214; G09G 2310/0297; G02F 2001/133397
See application file for complete search history.

(56) References Cited

U.S. PATENT DOCUMENTS

| | | | | |
|---|---|---|---|---|
| 6,784,863 B2* | 8/2004 | Yanagi | ................ | G09G 3/3648 345/94 |
| 6,903,716 B2* | 6/2005 | Kawabe | ................ | G09G 3/342 345/100 |
| 6,977,639 B2* | 12/2005 | Fujiwara | ............. | G09G 3/3648 345/94 |
| 8,040,310 B2* | 10/2011 | Hada | ..................... | G09G 3/003 345/96 |
| 8,081,255 B2* | 12/2011 | Koshimizu | ............. | G09G 5/36 348/441 |
| 8,228,320 B2* | 7/2012 | Morita | ................ | G09G 3/2096 326/62 |
| 8,269,710 B2* | 9/2012 | Masui | ................... | G02F 1/1345 345/100 |
| 8,368,829 B2* | 2/2013 | Kitayama | ............ | G09G 3/3614 349/38 |
| 8,411,117 B2* | 4/2013 | Fujioka | ................... | G06F 3/042 345/690 |
| 9,362,892 B2* | 6/2016 | Iwase | .................. | G09G 3/3677 |
| 9,430,983 B2* | 8/2016 | Qu | ............................ | G09G 3/20 |
| 9,542,030 B2* | 1/2017 | Kim | .................... | G06F 3/04166 |
| 9,690,418 B2* | 6/2017 | Sugita | ..................... | G06F 3/044 |
| 9,798,415 B2* | 10/2017 | Azumi | ................. | G06F 3/0416 |
| 9,927,894 B2* | 3/2018 | Abe | ....................... | G06F 3/0446 |
| 2002/0063669 A1* | 5/2002 | Yanagi | ................. | G09G 3/3648 345/87 |
| 2003/0080951 A1 | 5/2003 | Fujiwara et al. | | |
| 2003/0169247 A1* | 9/2003 | Kawabe | ................ | G09G 3/342 345/204 |
| 2005/0212744 A1* | 9/2005 | Hada | .................... | G09G 3/3614 345/96 |
| 2007/0091204 A1* | 4/2007 | Koshimizu | .............. | G09G 5/36 348/441 |
| 2009/0213054 A1* | 8/2009 | Masui | ................... | G02F 1/1345 345/88 |
| 2009/0244036 A1* | 10/2009 | Morita | ................. | G09G 3/2096 345/204 |
| 2012/0299897 A1* | 11/2012 | Kitayama | ............ | G09G 3/3614 345/211 |
| 2013/0050146 A1* | 2/2013 | Saitoh | .................. | G09G 3/3688 345/174 |
| 2014/0111495 A1* | 4/2014 | Iwase | ................... | G09G 3/3677 345/211 |
| 2014/0160067 A1* | 6/2014 | Kim | ...................... | G06F 3/0416 345/174 |
| 2015/0161961 A1* | 6/2015 | Qu | ........................... | G09G 3/20 345/212 |
| 2015/0242041 A1* | 8/2015 | Sugita | ..................... | G06F 3/044 345/174 |
| 2015/0355767 A1* | 12/2015 | Abe | ....................... | G06F 3/0416 345/174 |
| 2016/0085363 A1* | 3/2016 | Azumi | .................. | G06F 3/0416 345/173 |
| 2016/0307527 A1* | 10/2016 | Tanaka | .................. | G09G 3/3648 |
| 2017/0206852 A1* | 7/2017 | Liu | ........................ | G09G 3/3677 |
| 2018/0151138 A1* | 5/2018 | Jinta | ........................ | G09G 3/20 |

FOREIGN PATENT DOCUMENTS

| | | |
|---|---|---|
| EP | 1197790 A2 | 4/2002 |
| EP | 2573752 A1 | 3/2013 |
| JP | 09-204159 A | 8/1997 |
| JP | 2001-042287 A | 2/2001 |
| JP | 2002-182621 A | 6/2002 |
| JP | 2003-131632 A | 5/2003 |
| KR | 2002-0027275 A | 4/2002 |
| WO | 2011/145360 A1 | 11/2011 |

OTHER PUBLICATIONS

International Search Report and Written Opinion of PCT Application No. PCT/JP2016/065609, dated Jul. 19, 2016, 10 pages of ISRWO.

\* cited by examiner

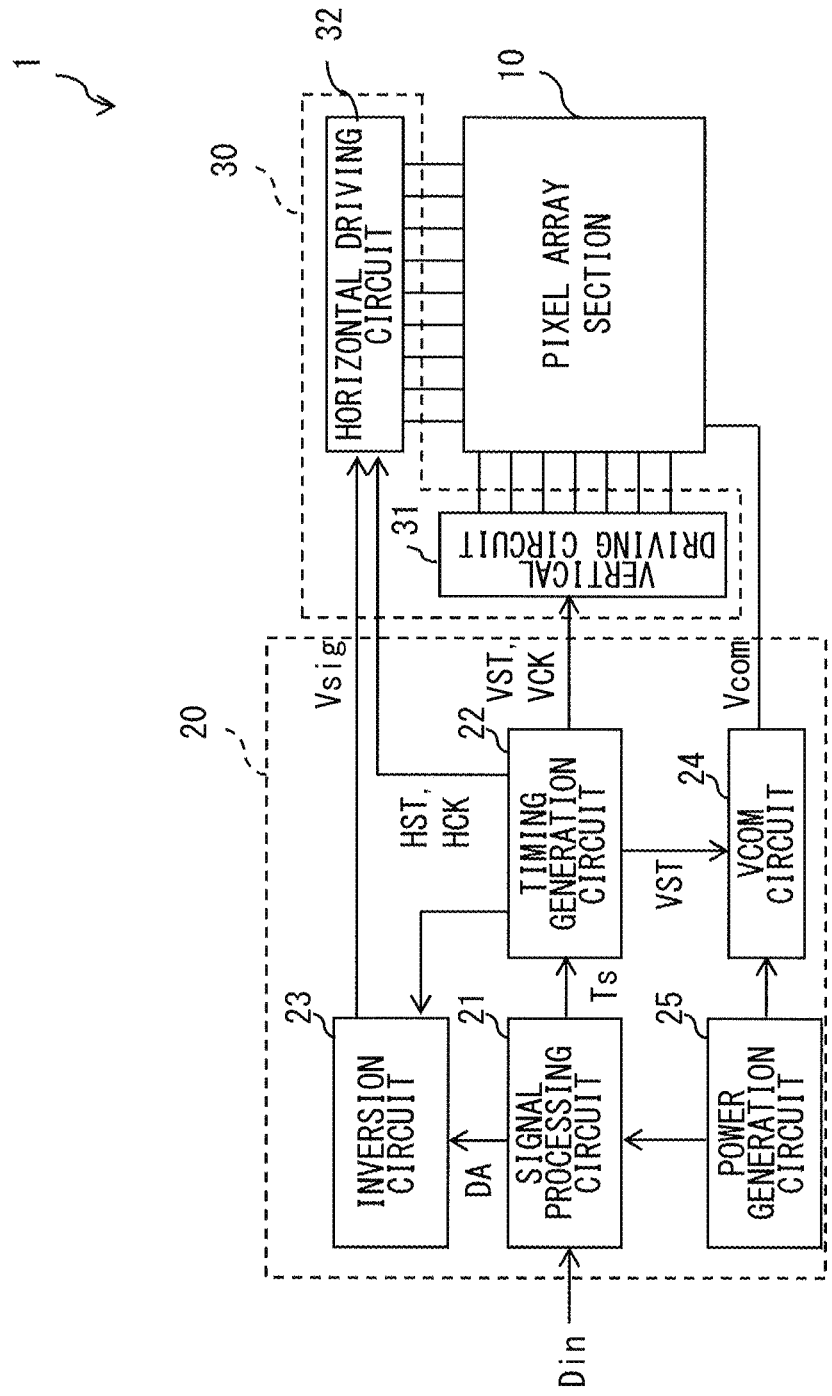

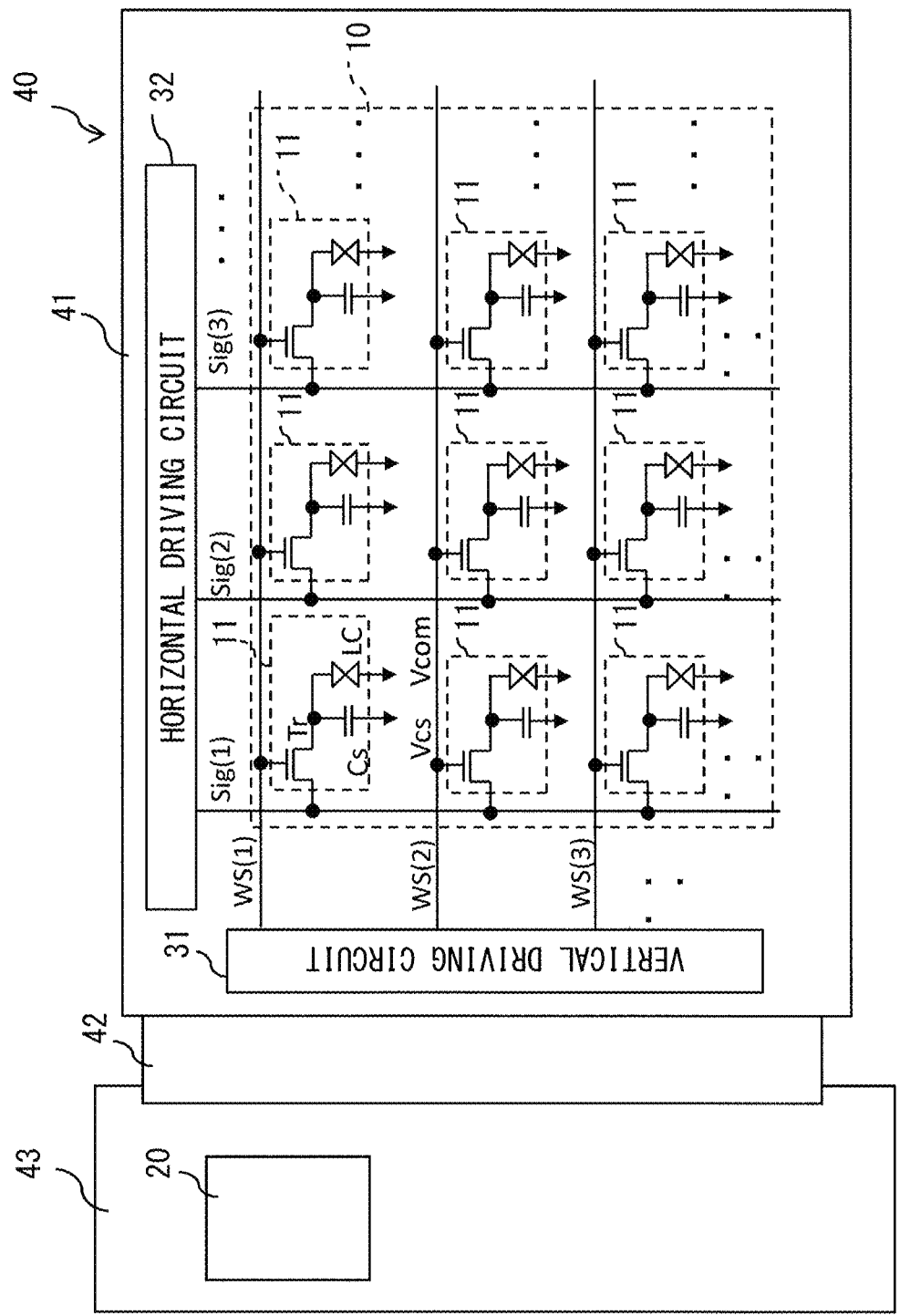
[FIG. 2]

[ FIG. 3 ]
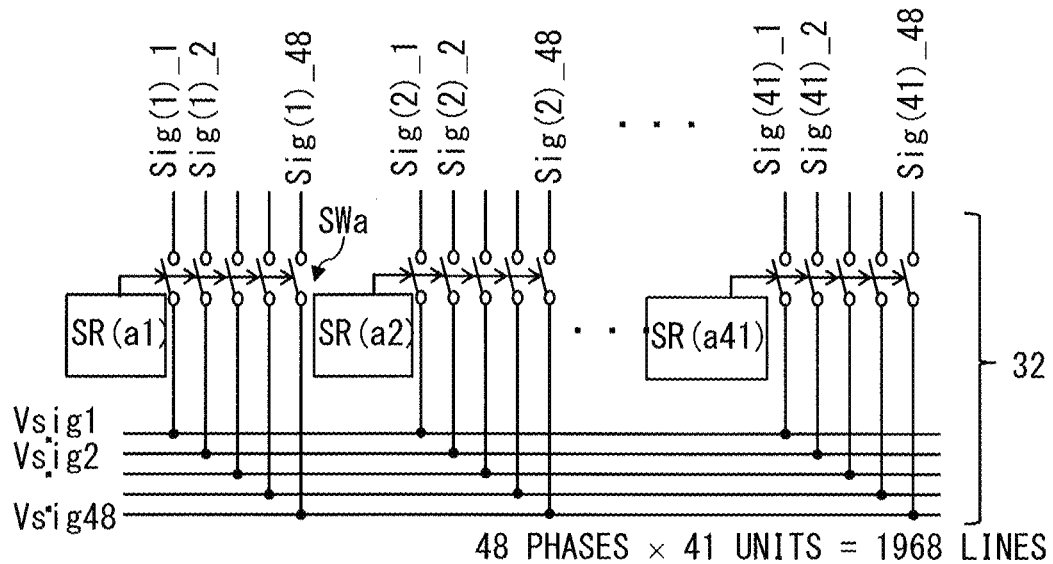
[ FIG. 4 ]
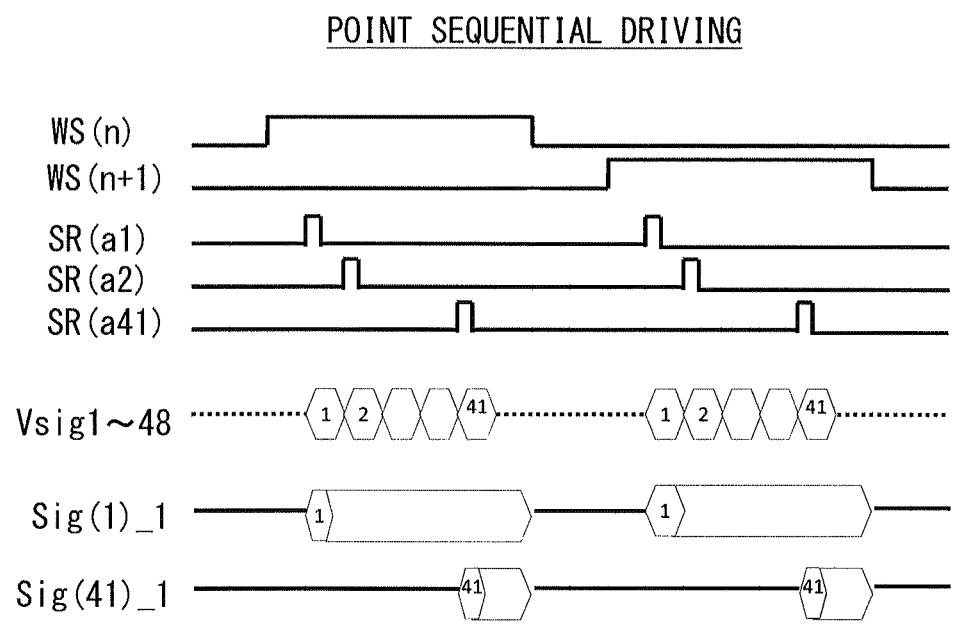

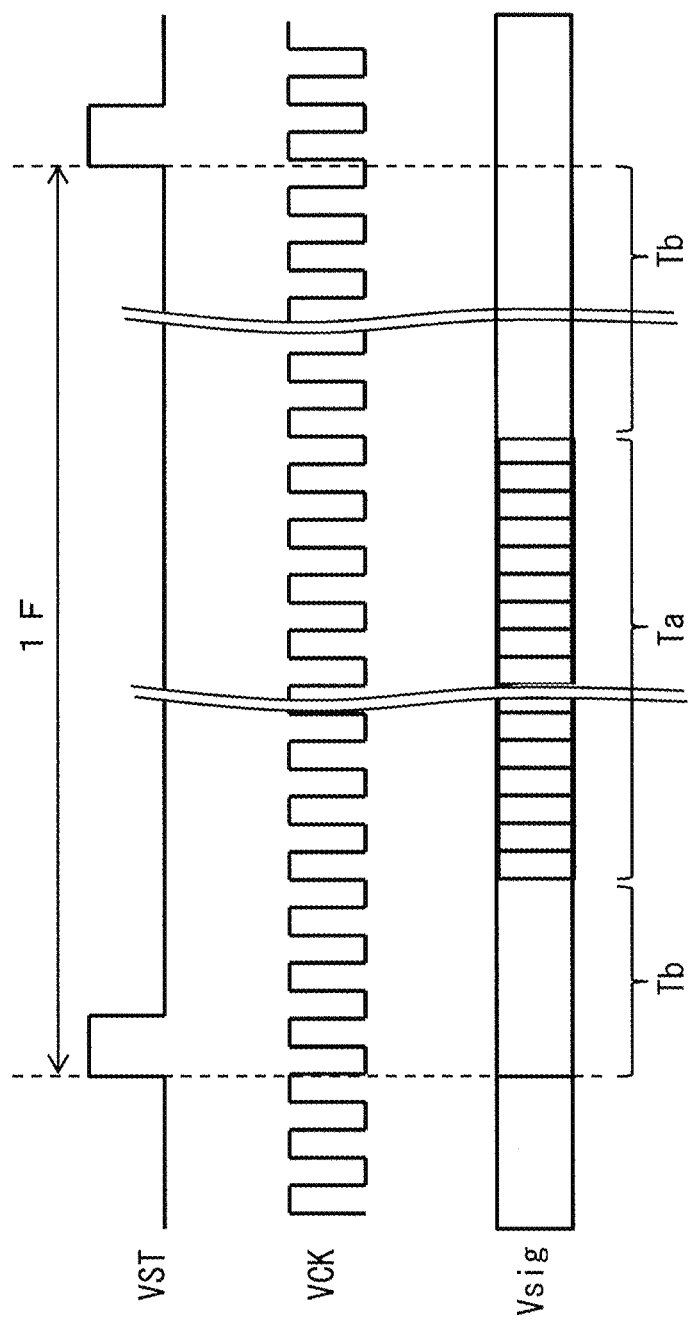
[FIG. 5]

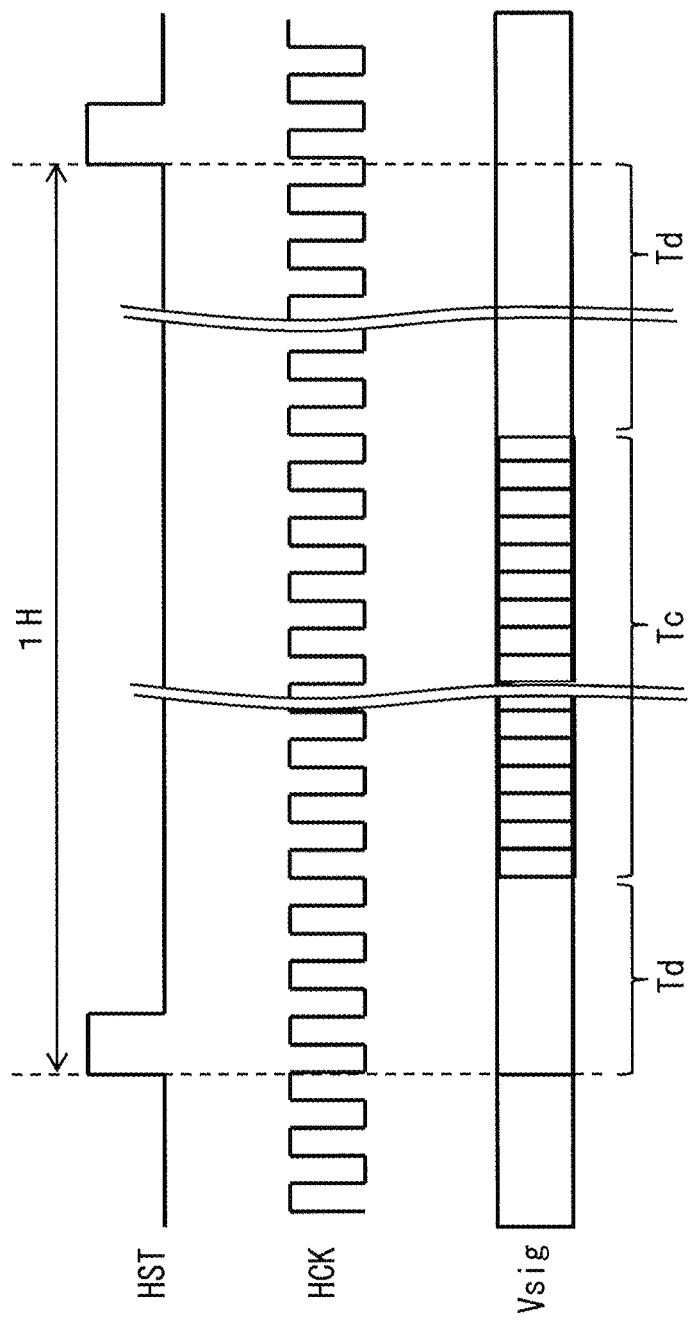
[FIG. 6]

[ FIG. 7 ]
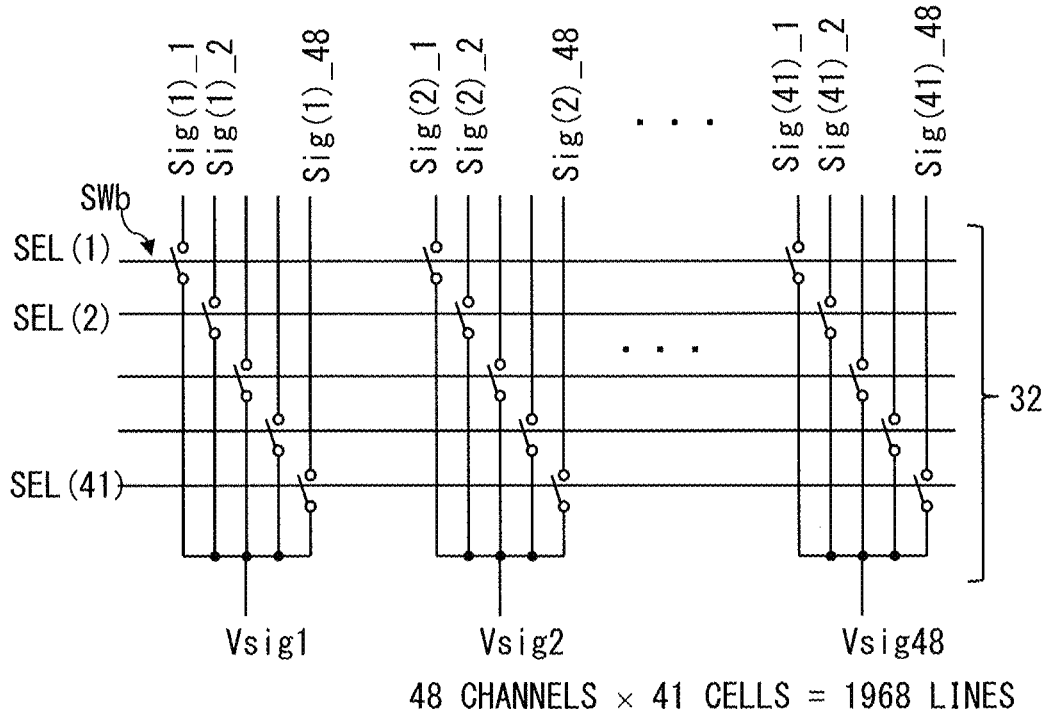
[ FIG. 8 ]
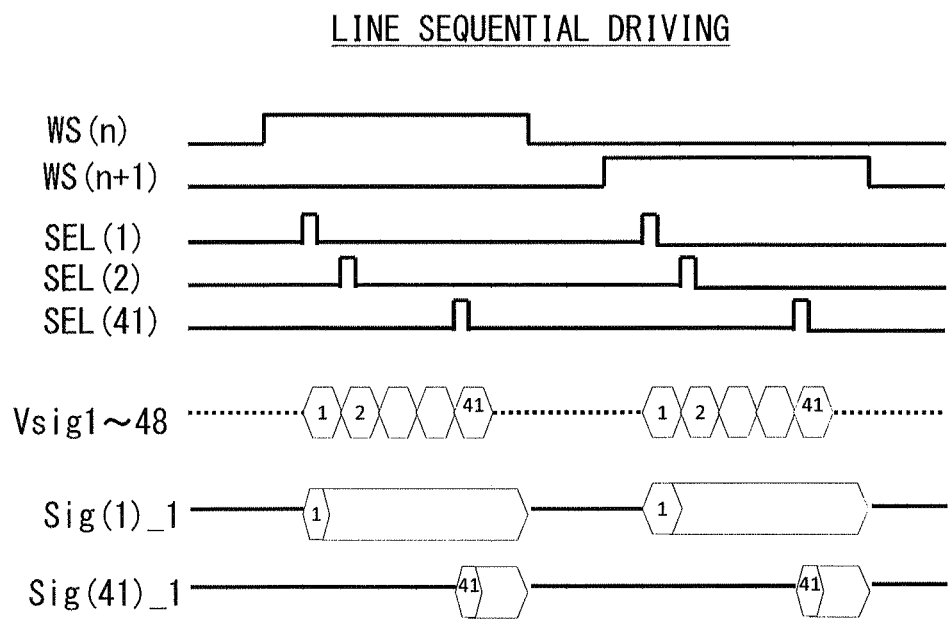

[FIG. 9]
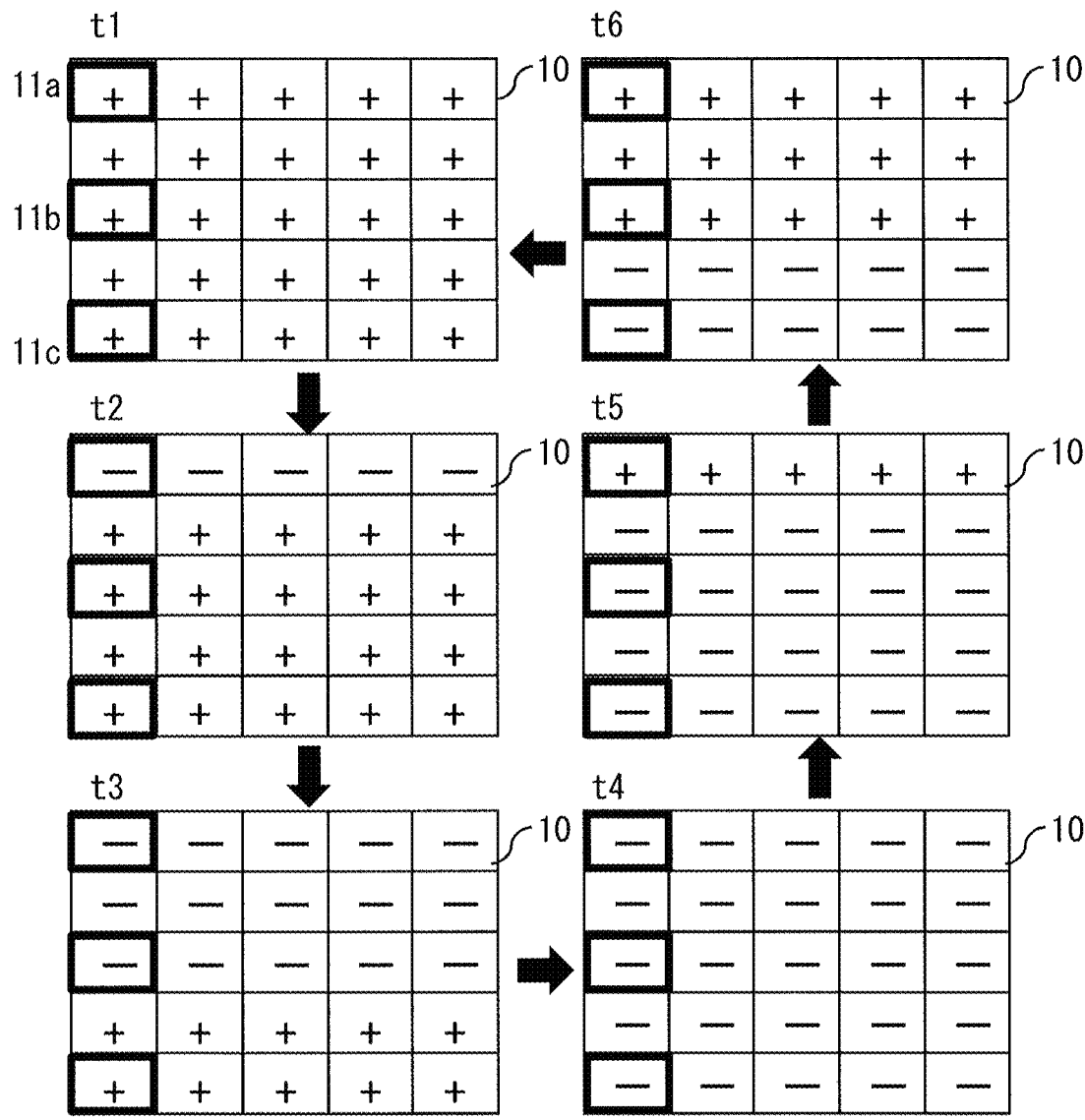

[ FIG. 10 ]
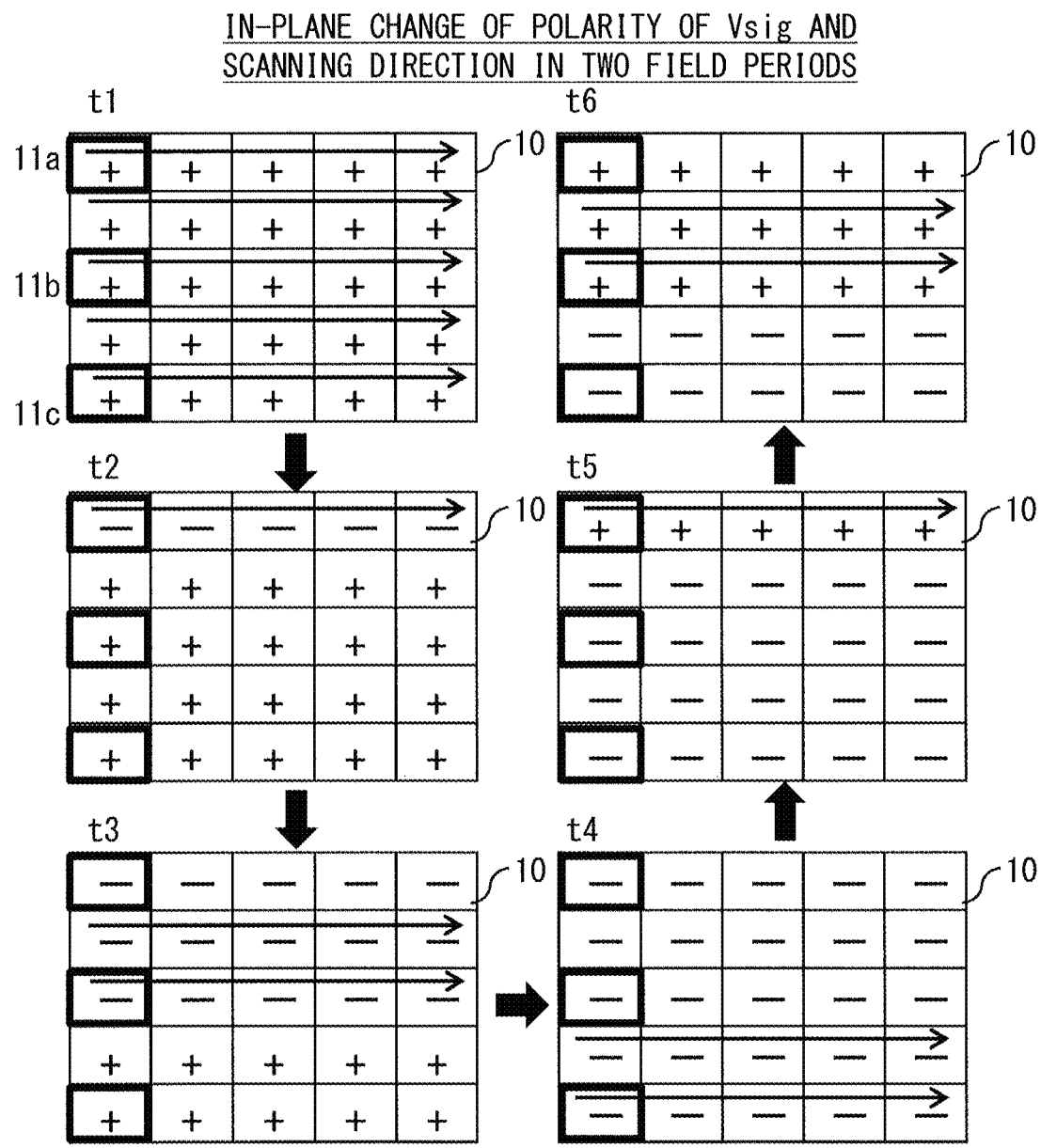

[ FIG. 11 ]
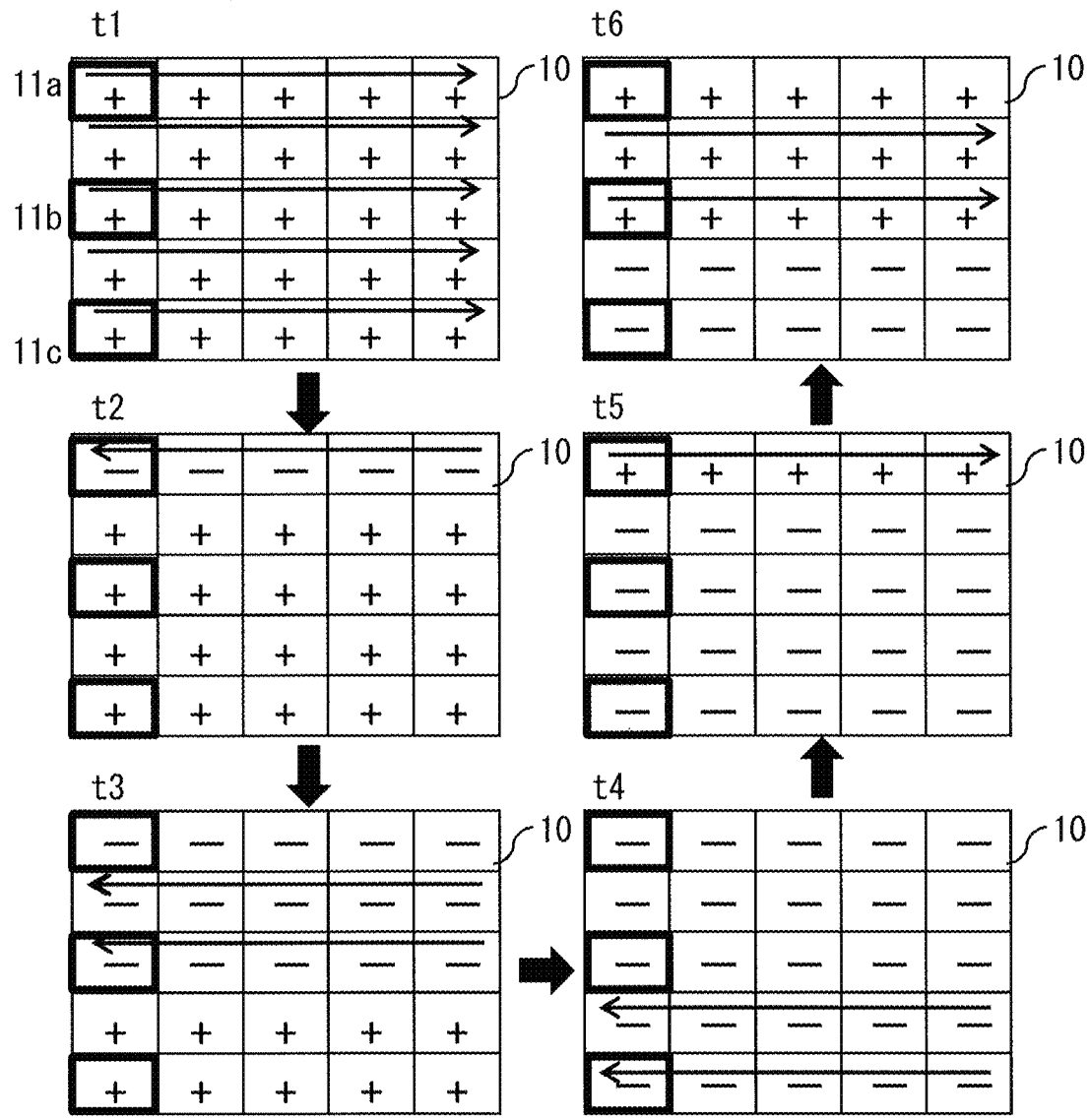

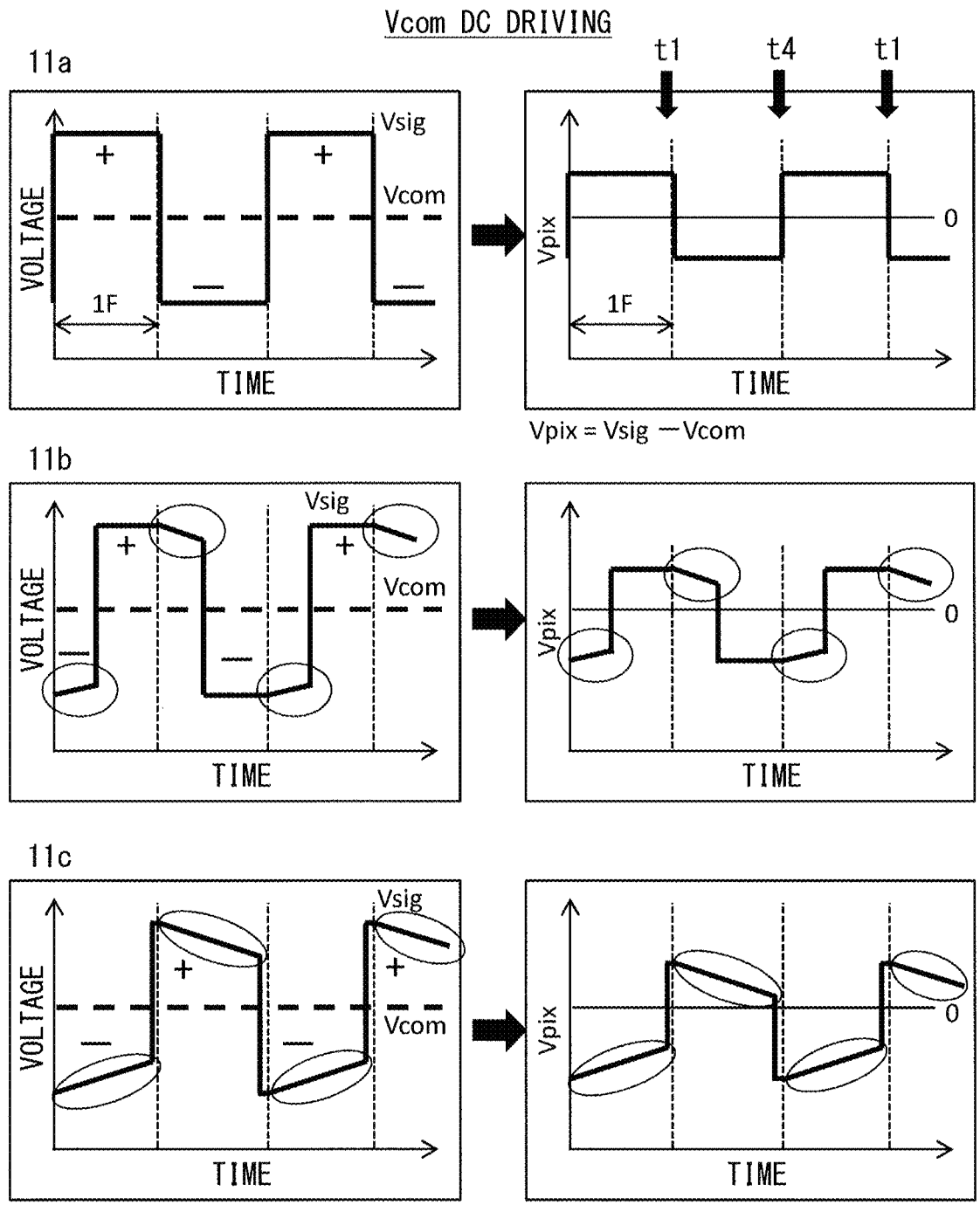

[FIG. 13]
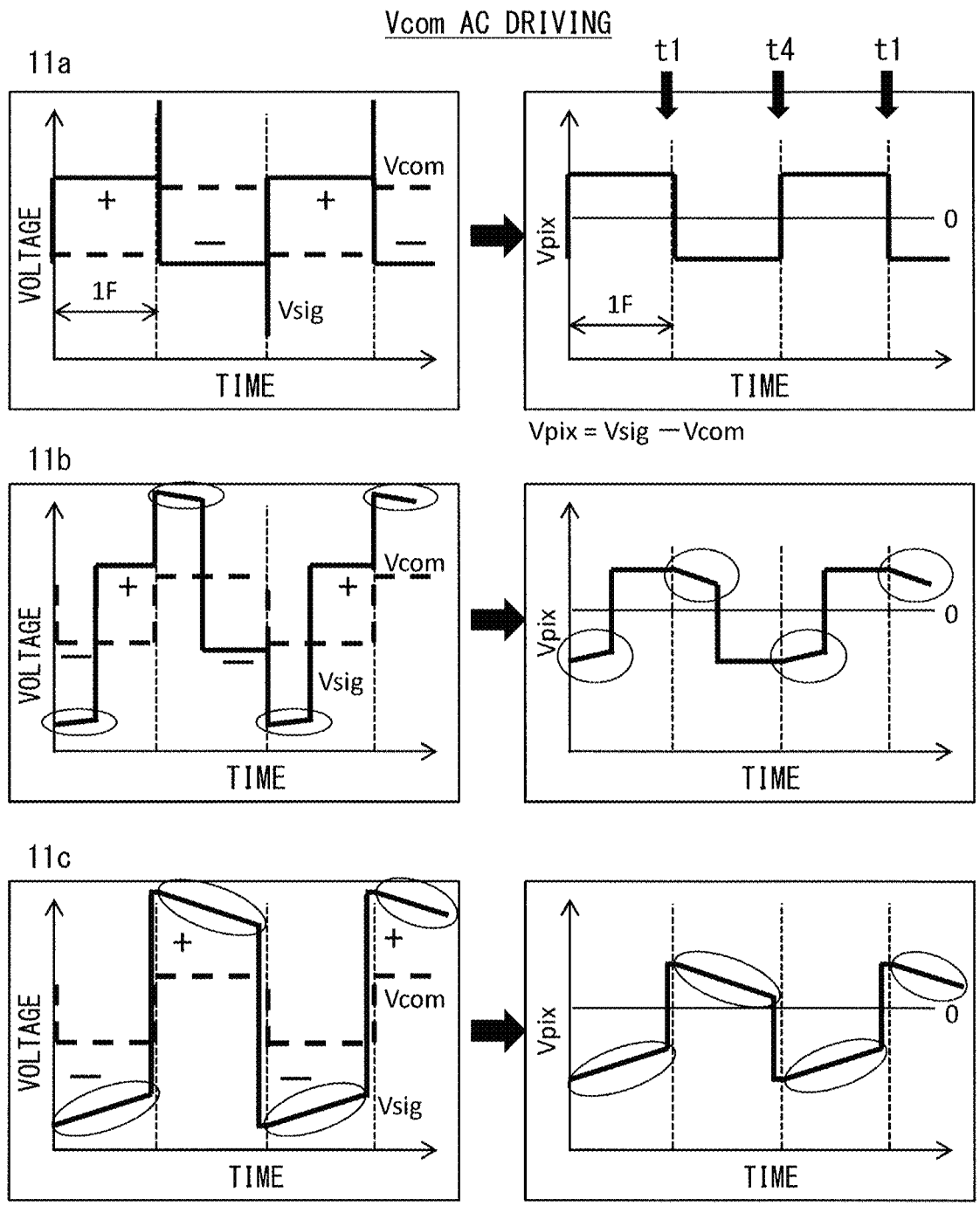

[ FIG. 14 ]
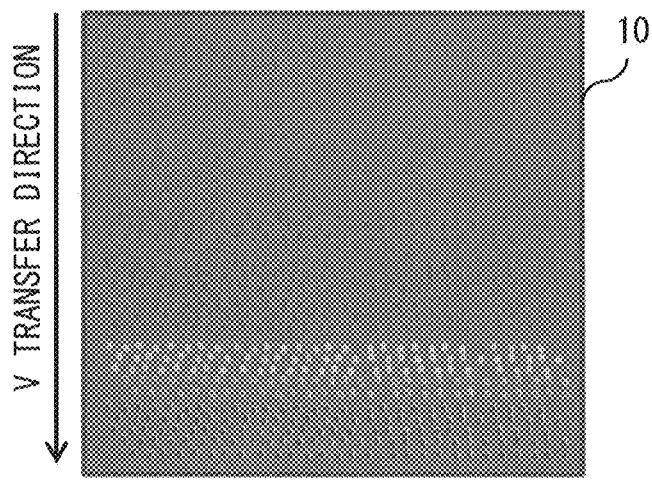

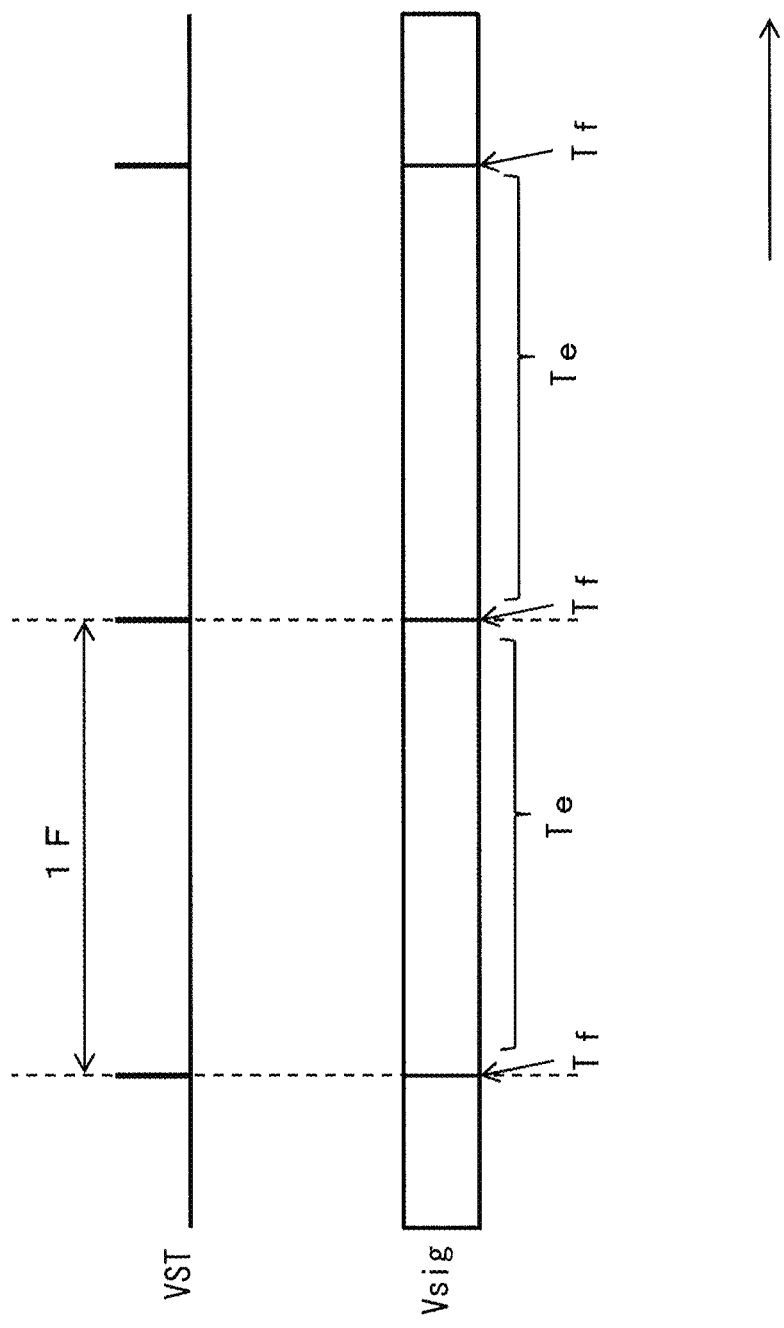
[FIG. 15]

[ FIG. 16 ]
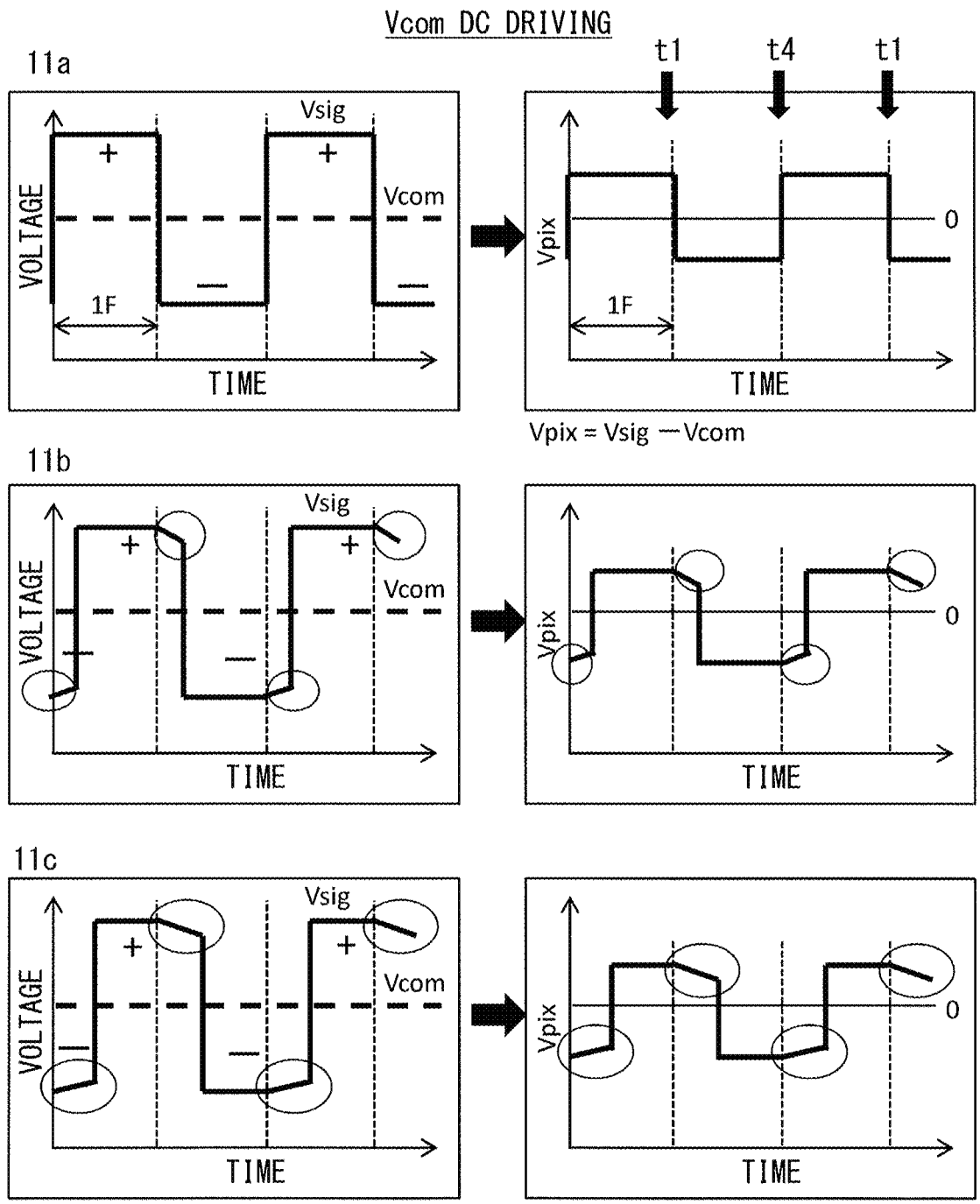

[ FIG. 17 ]
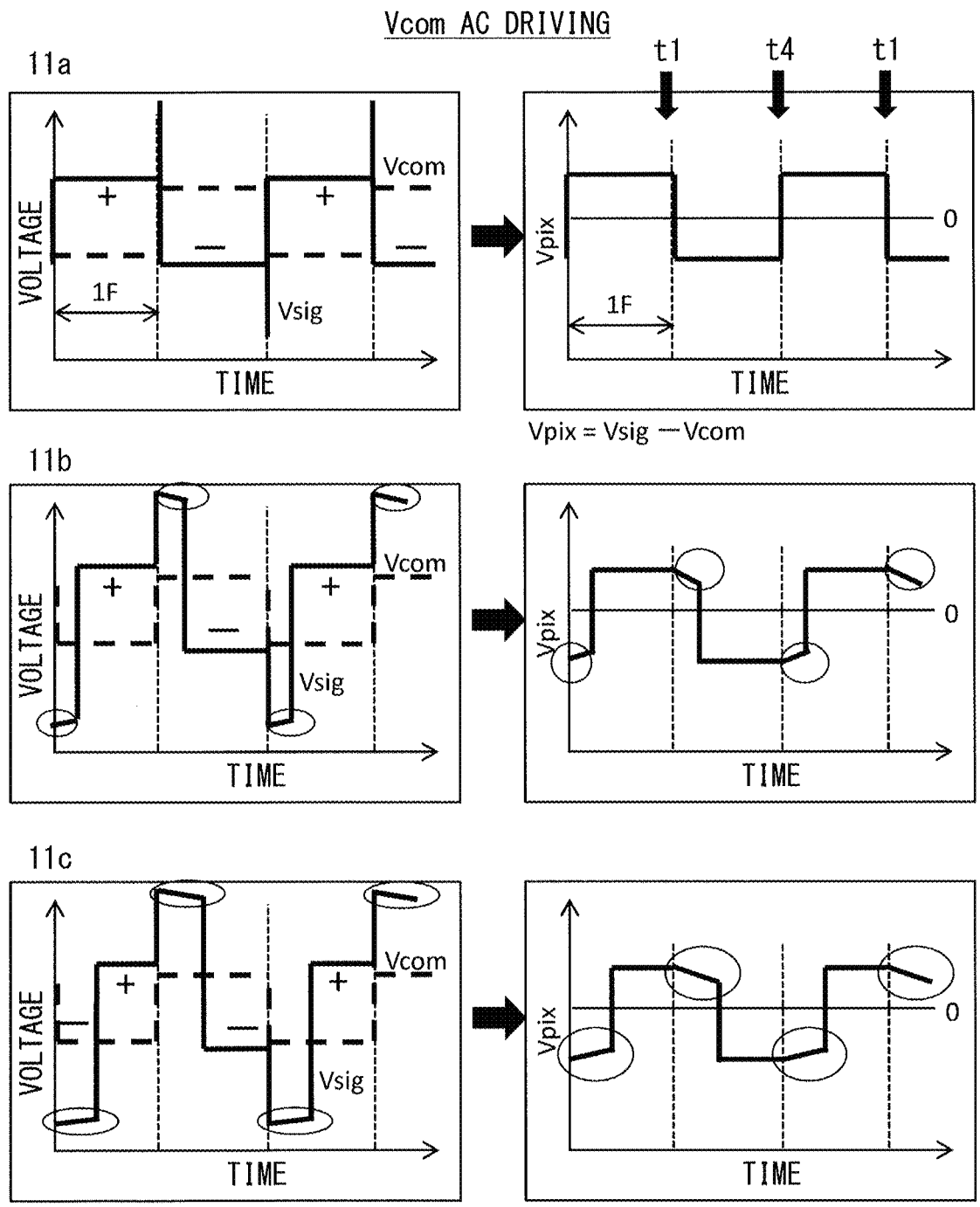

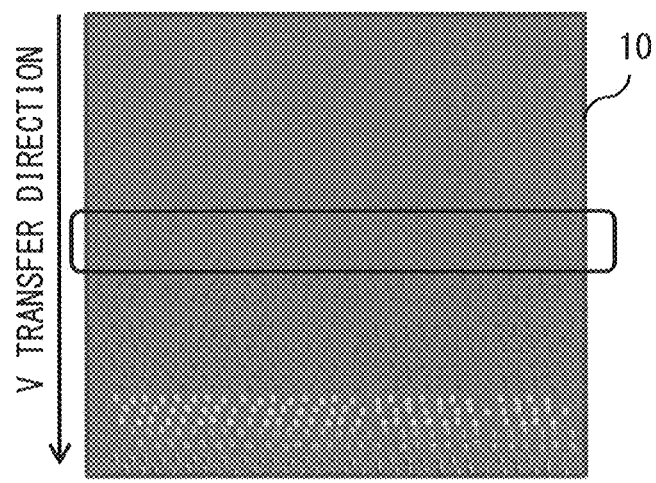
[ FIG. 18 ]

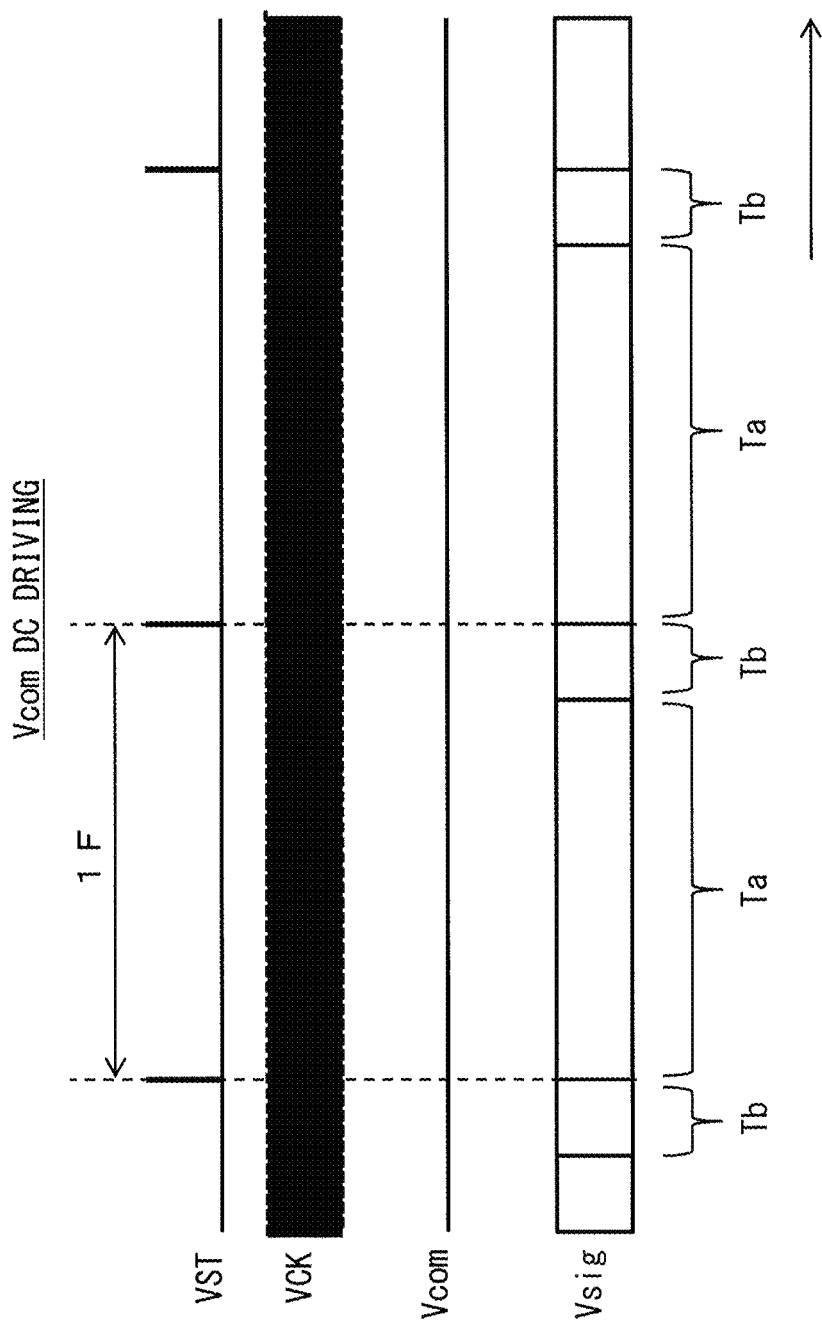

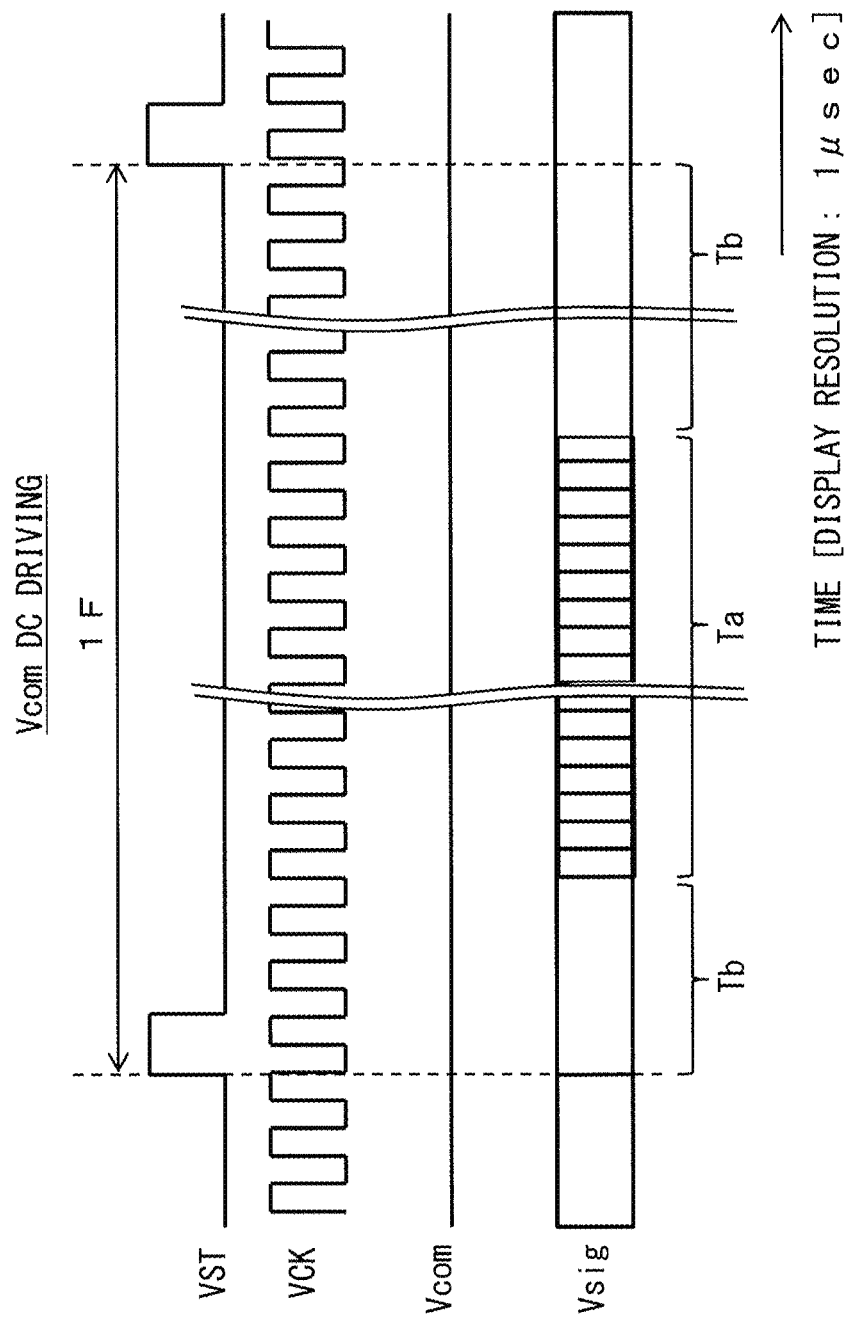

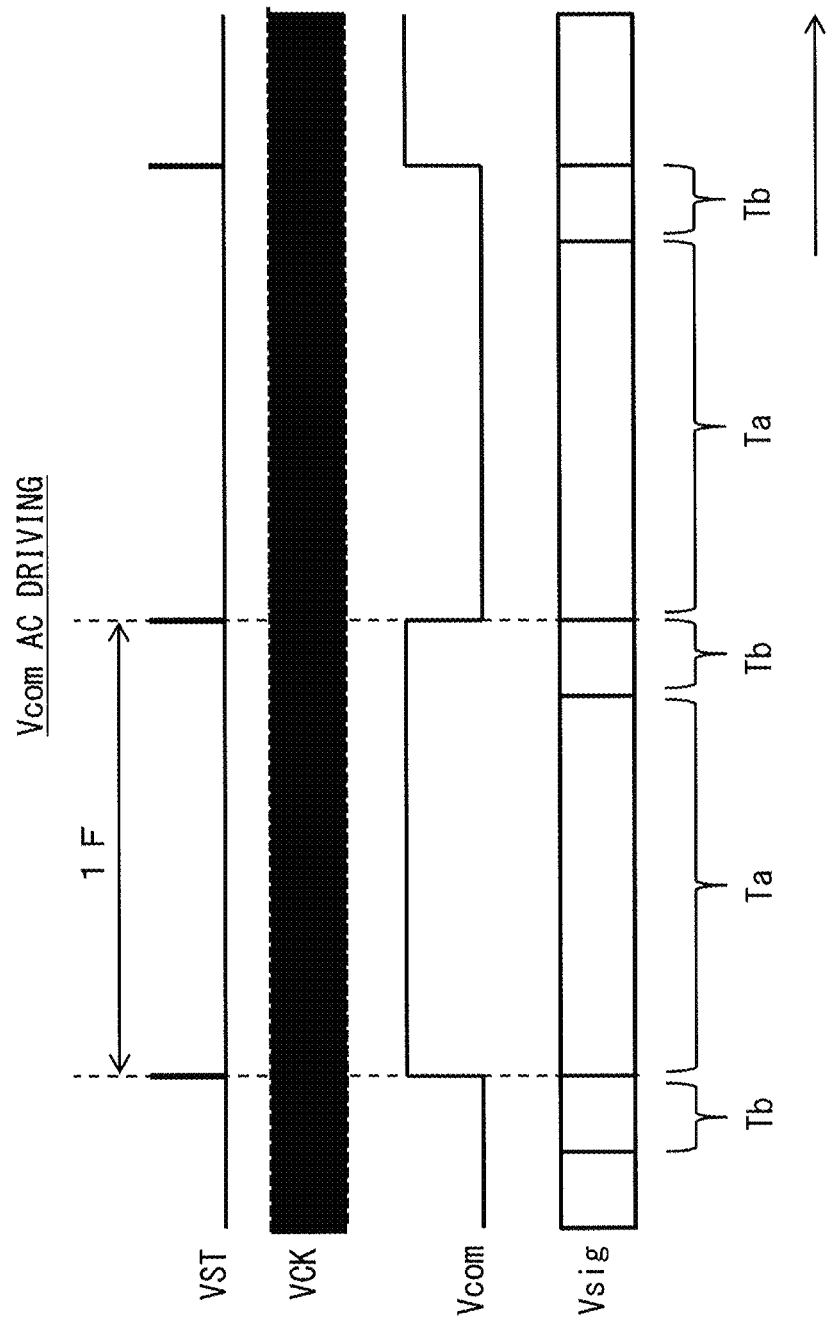
[FIG. 20A]

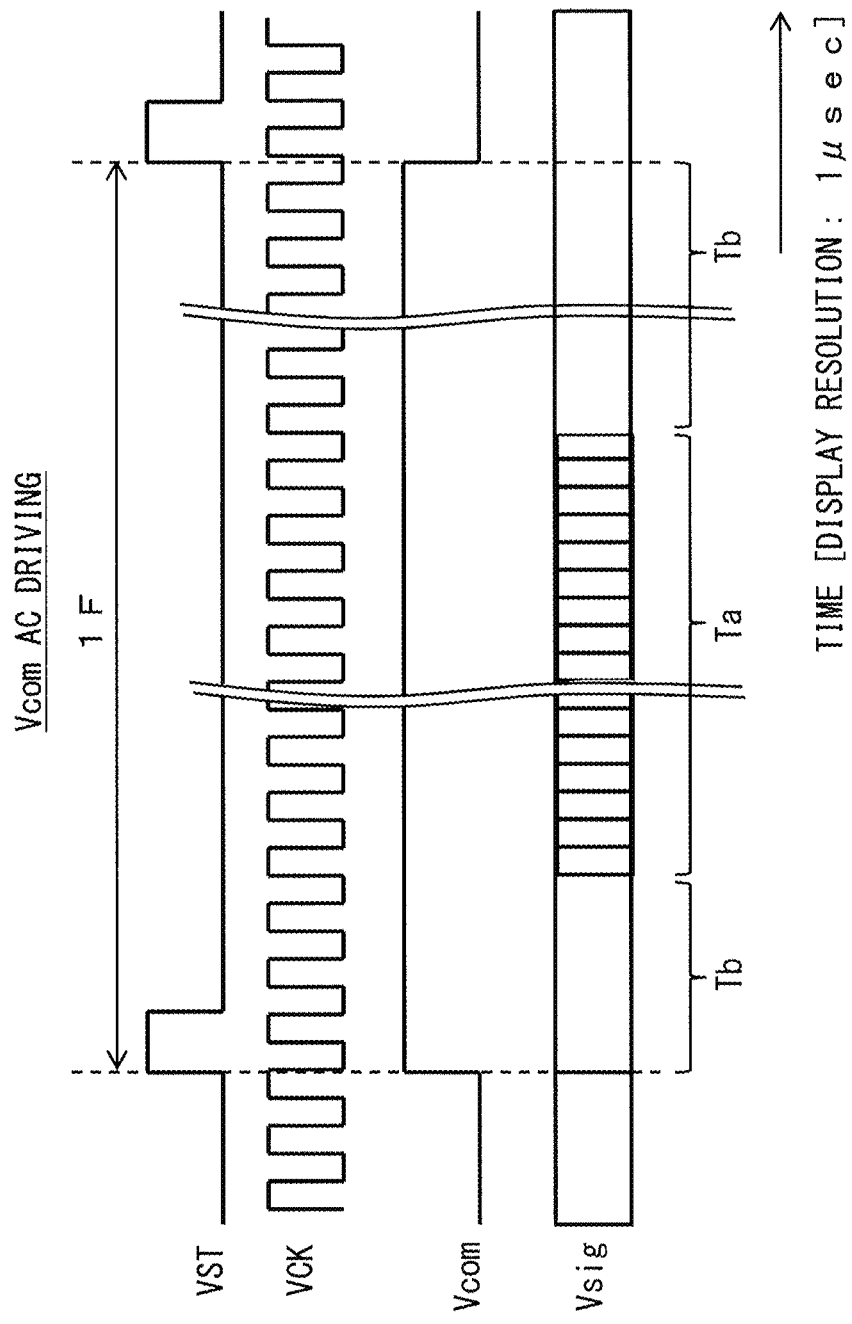

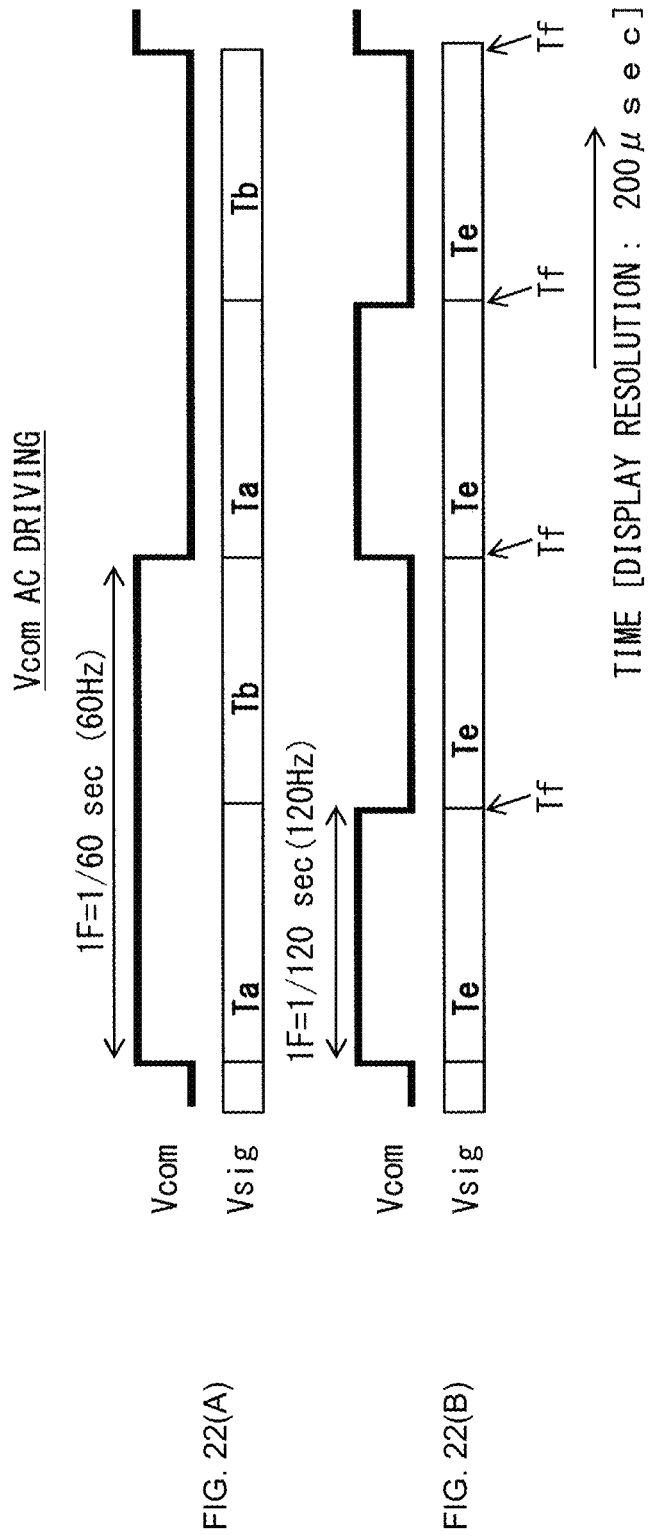

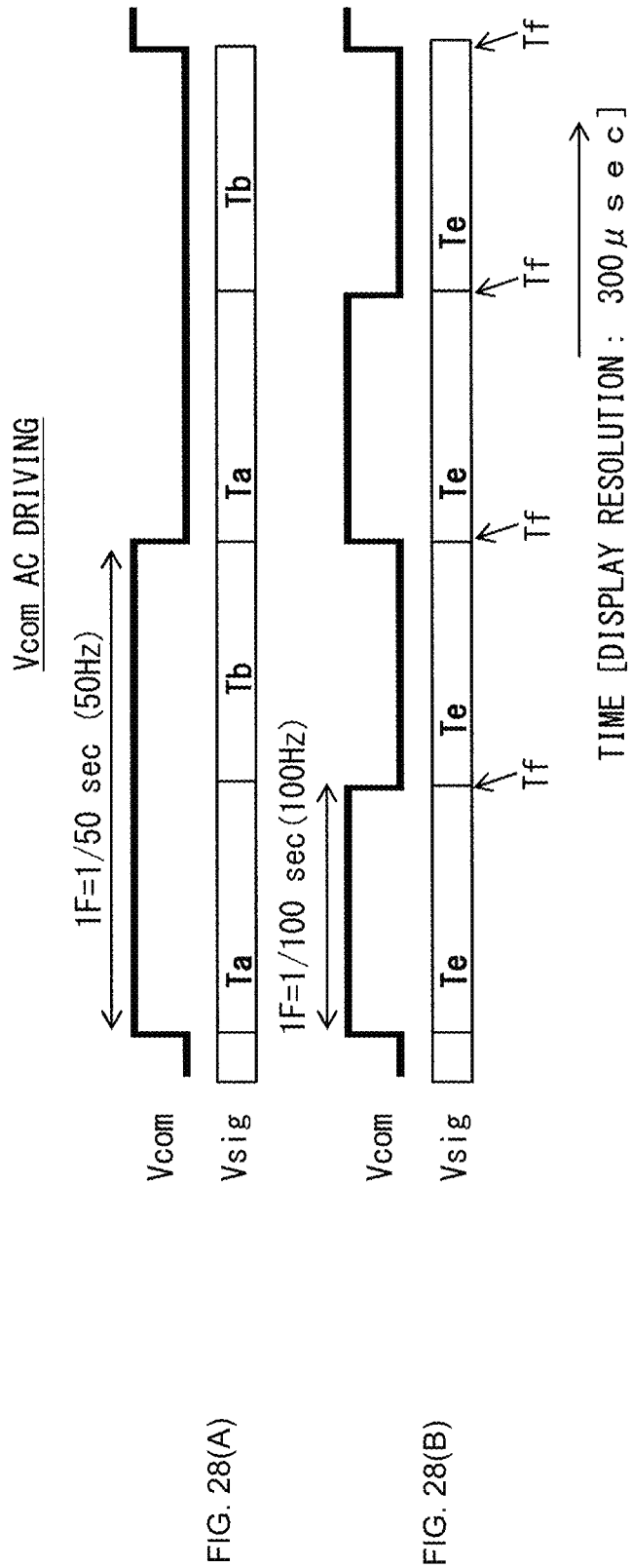

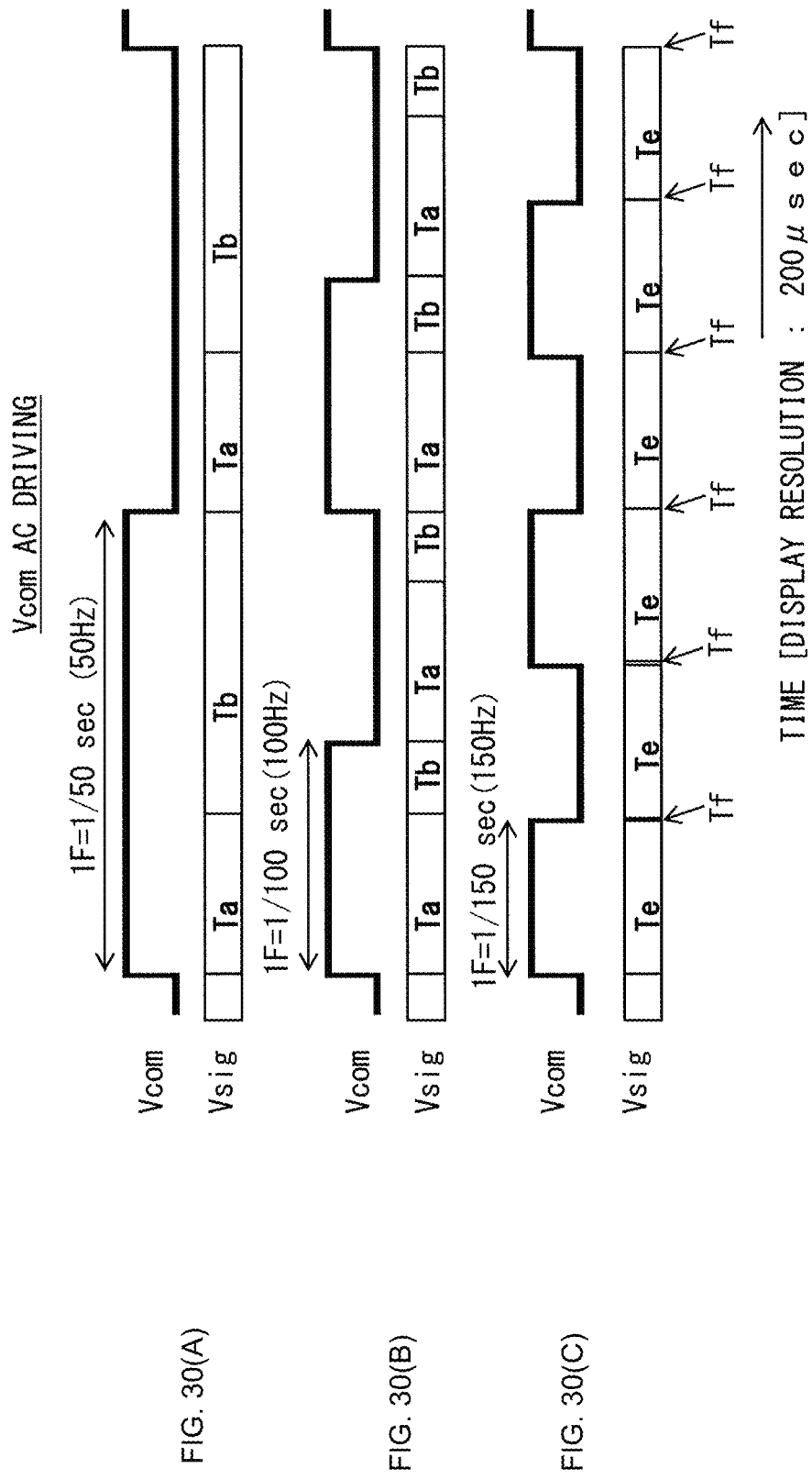

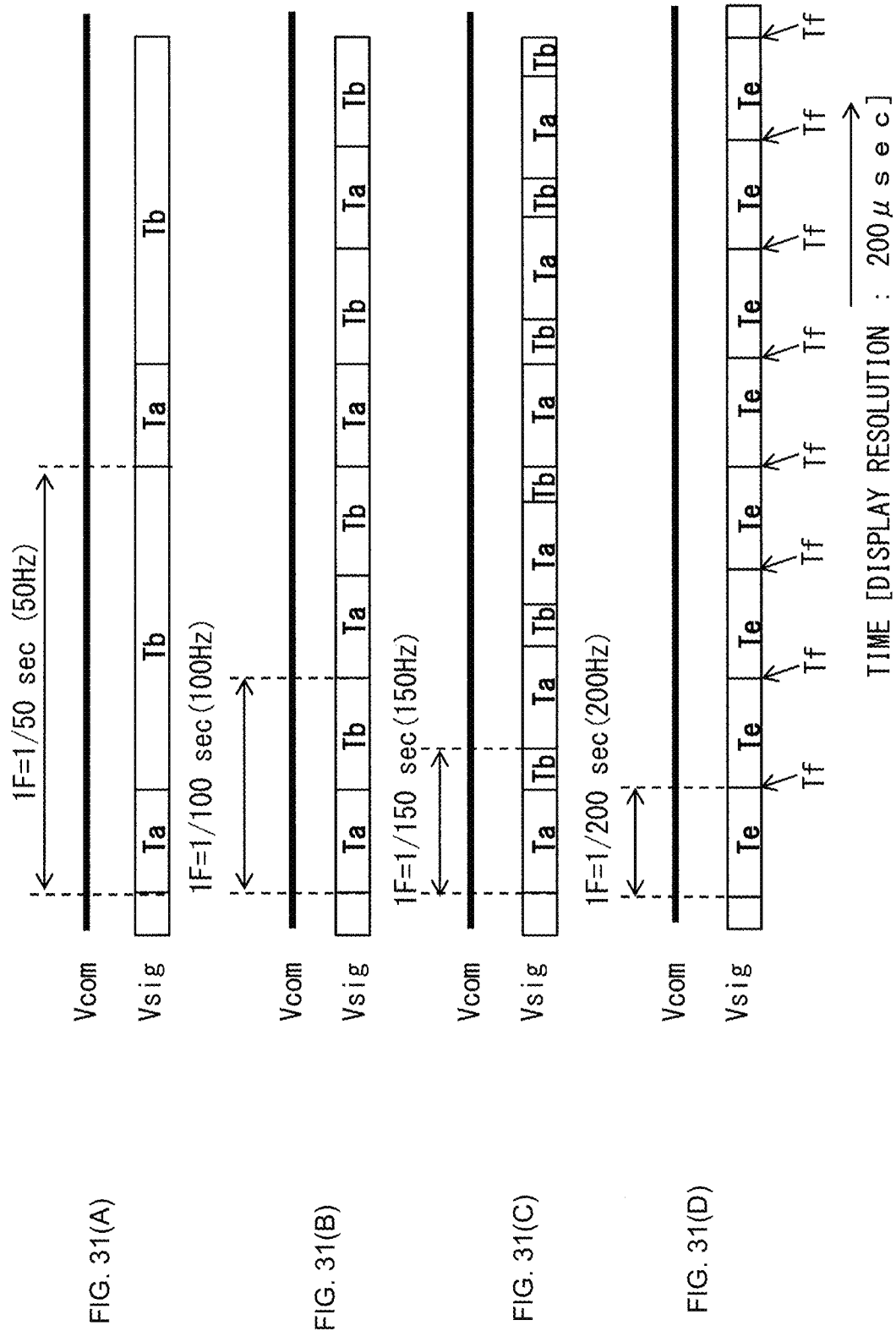

[ FIG. 33 ]
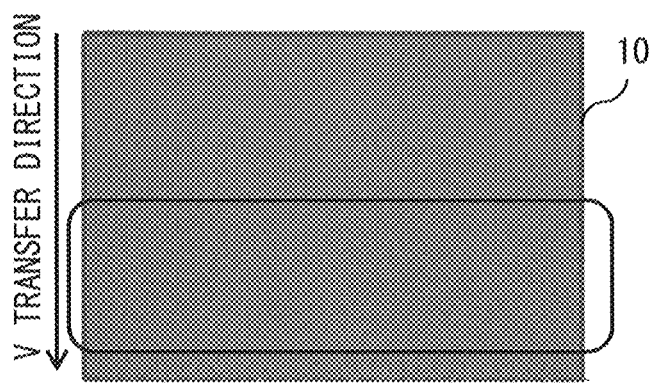

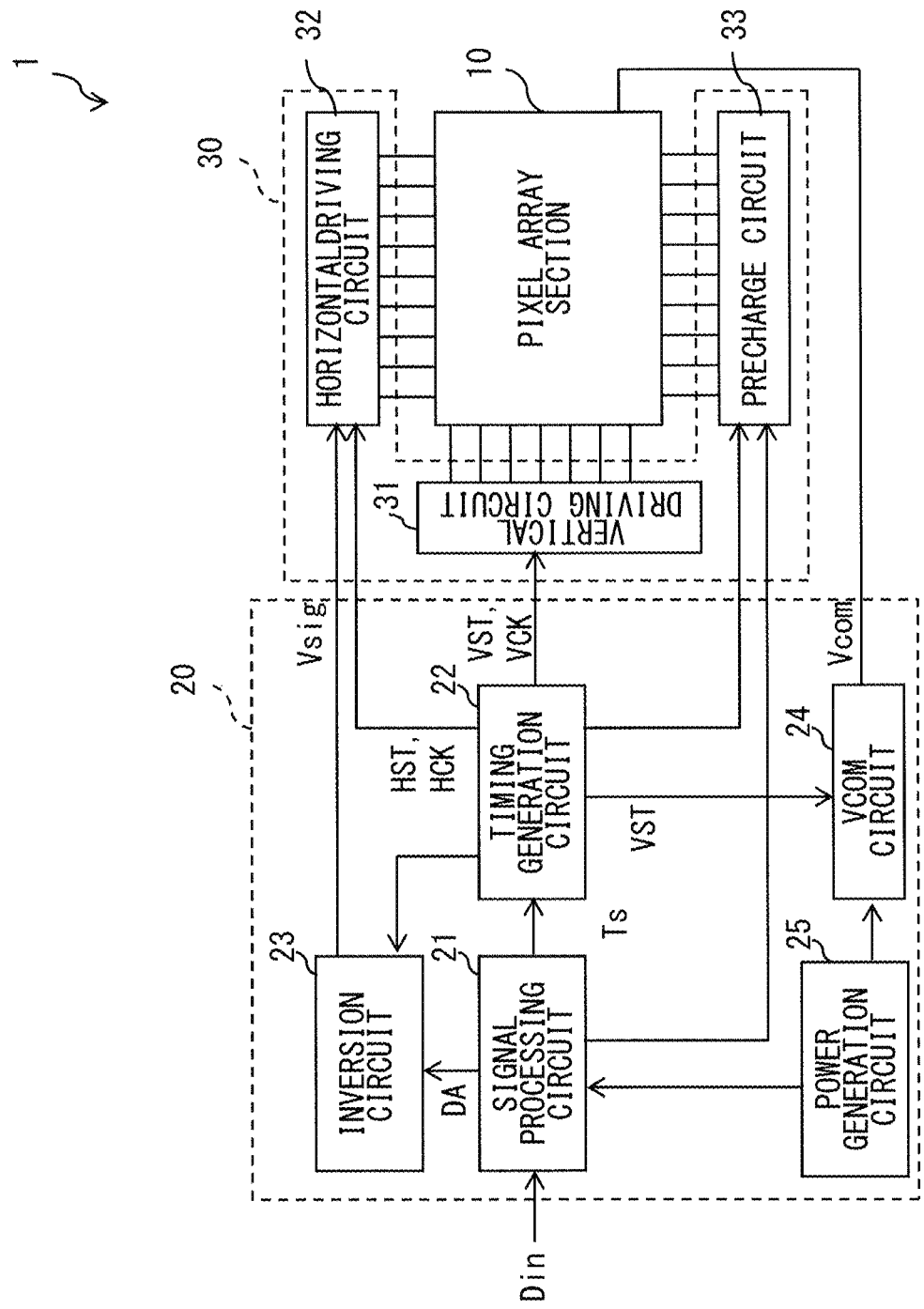
[FIG. 35]

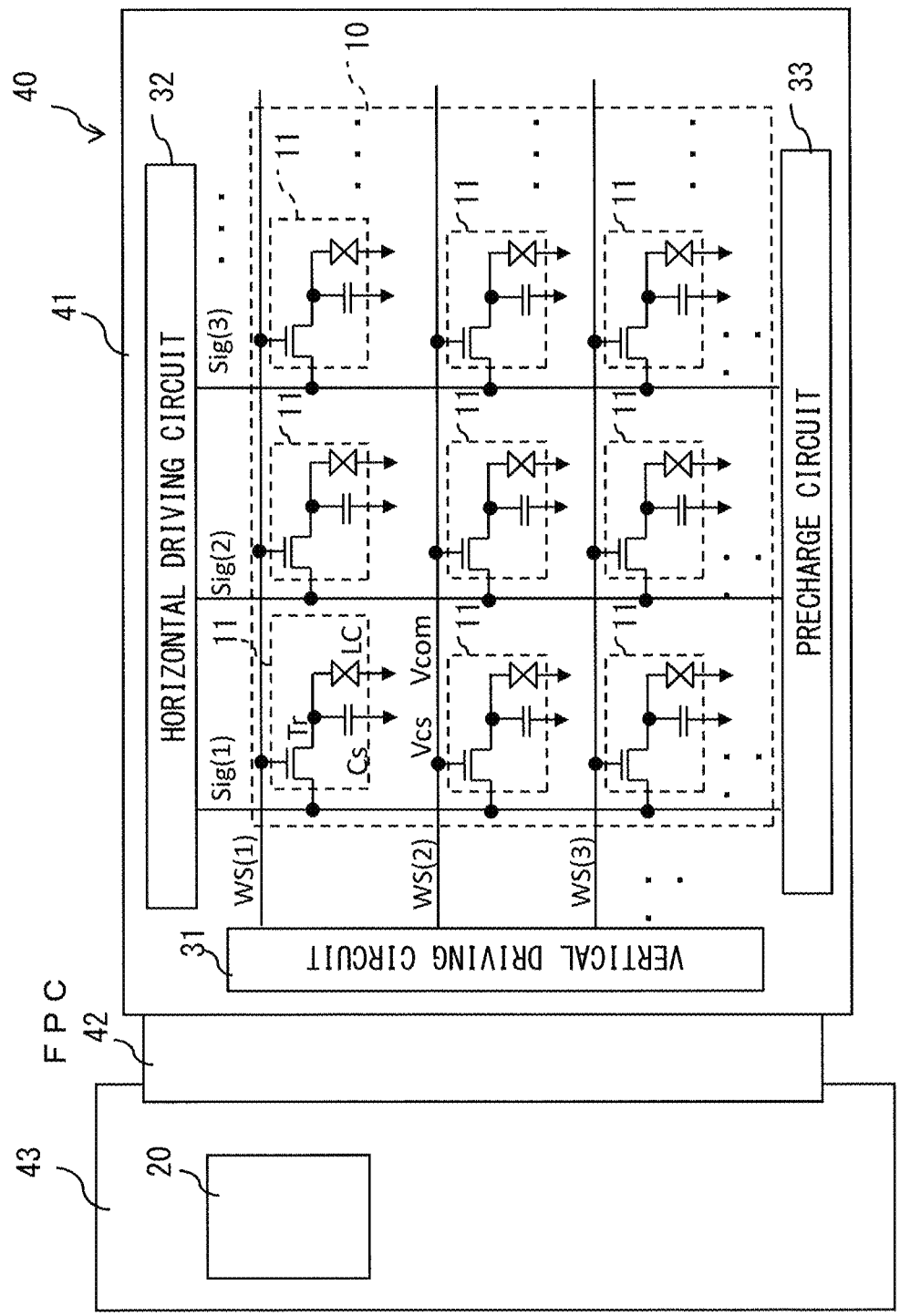
[FIG. 36]

[FIG. 37]
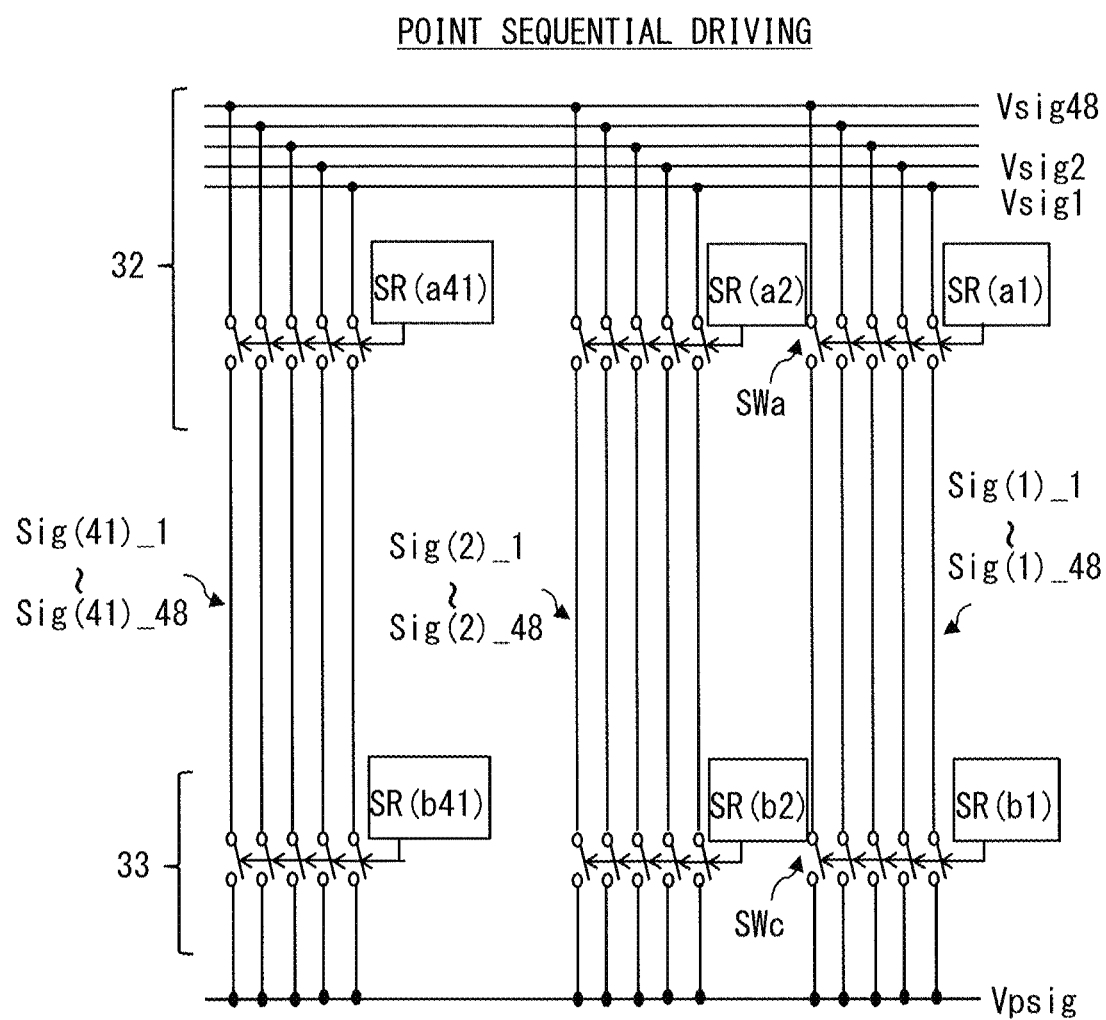

[ FIG. 38 ]
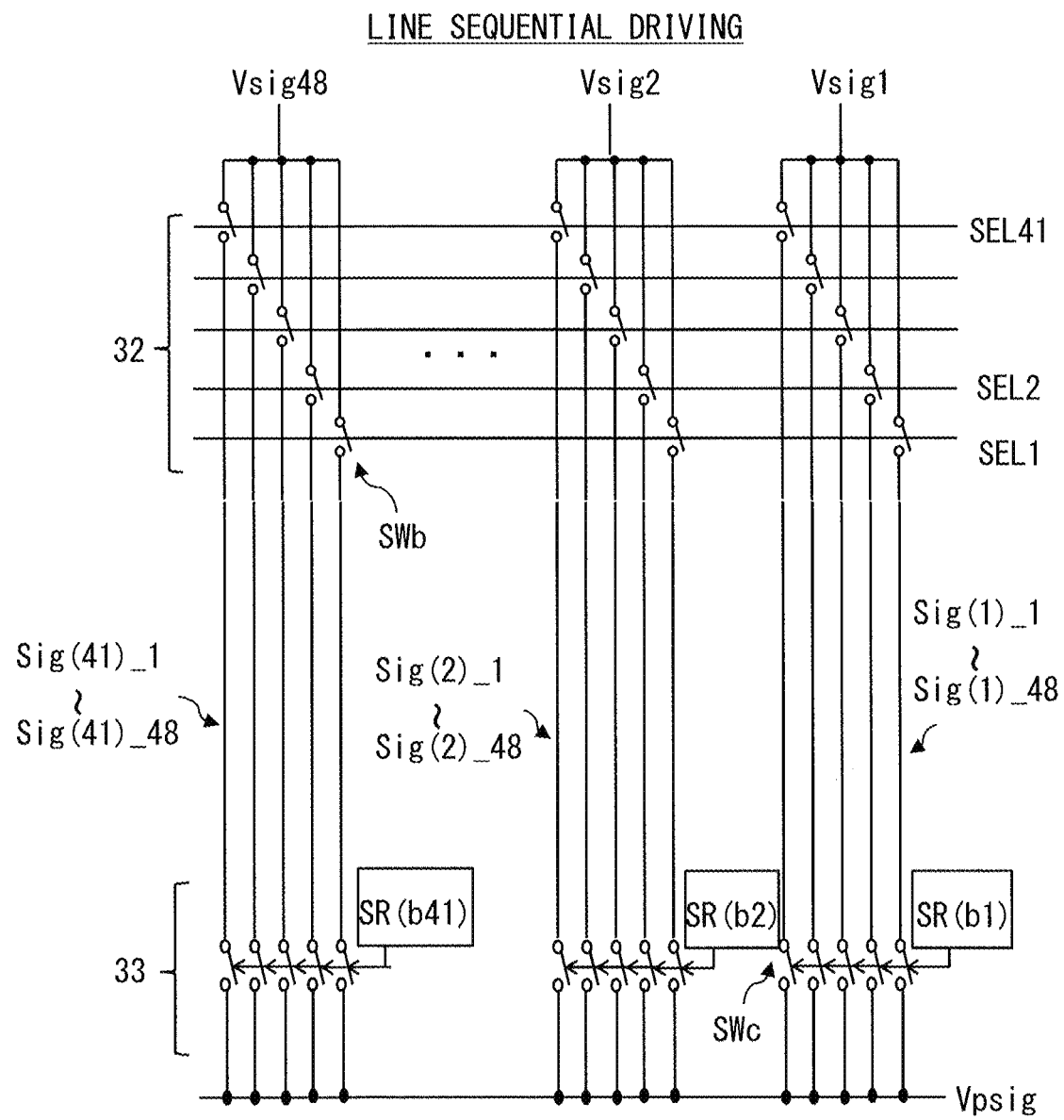

[ FIG. 39 ]
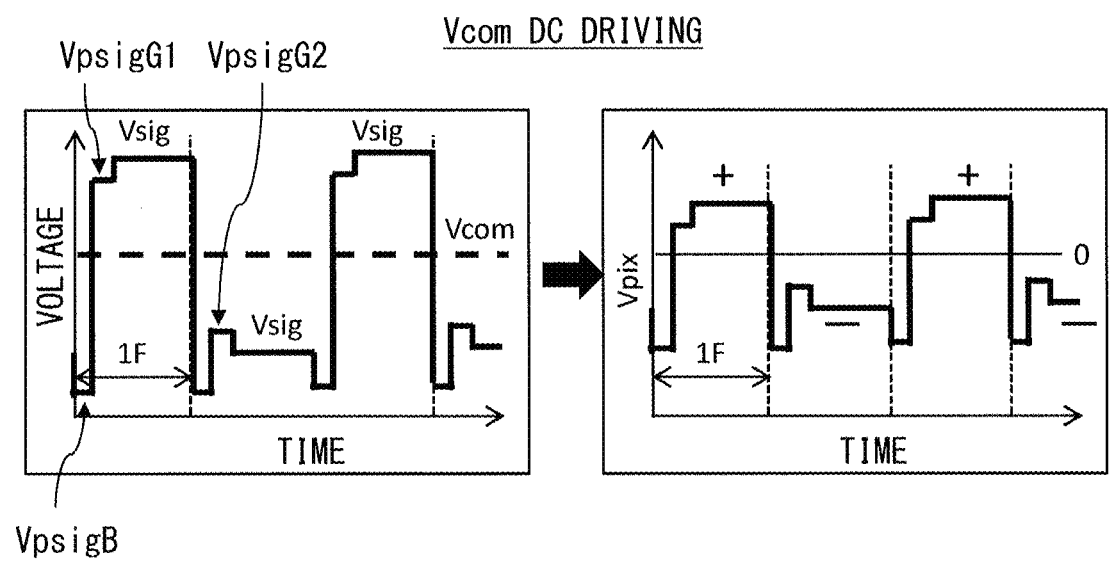

[ FIG. 40 ]
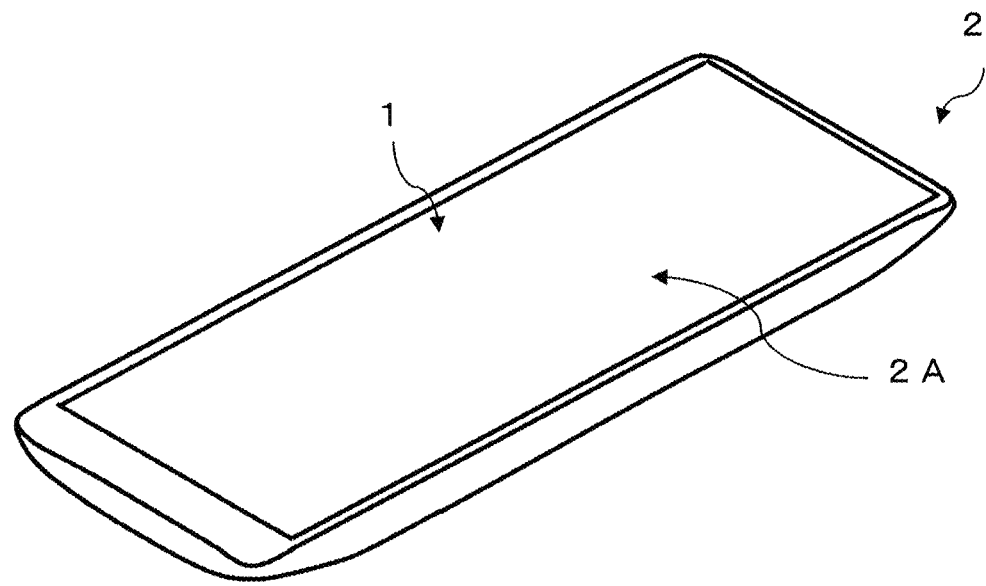
[ FIG. 41 ]
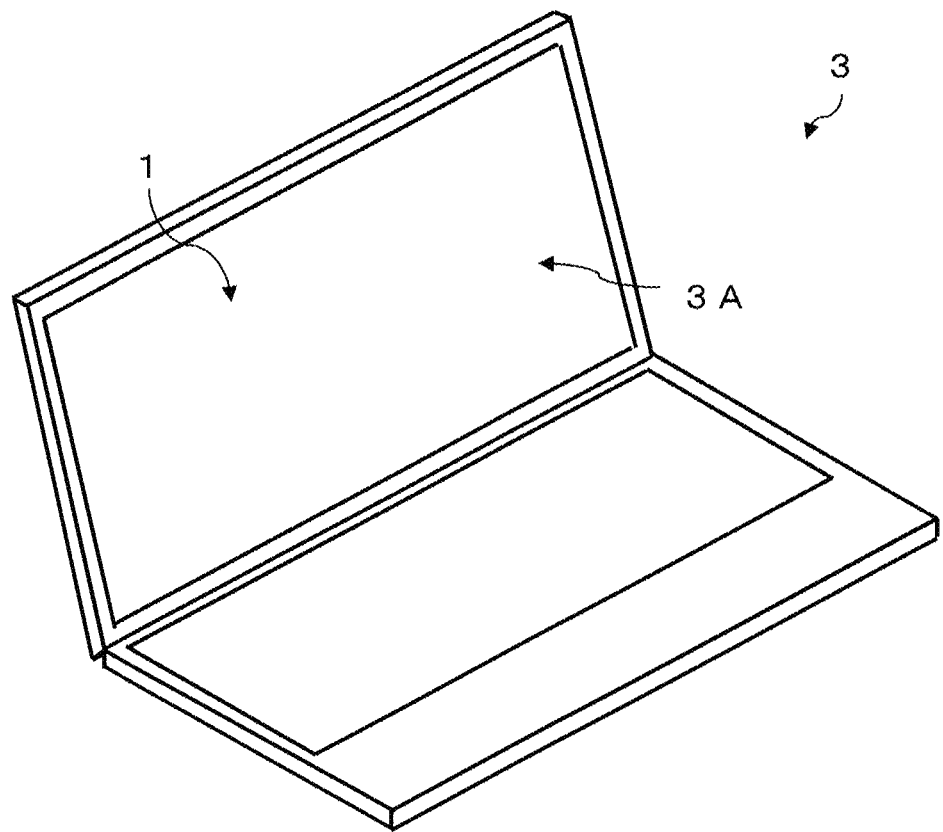

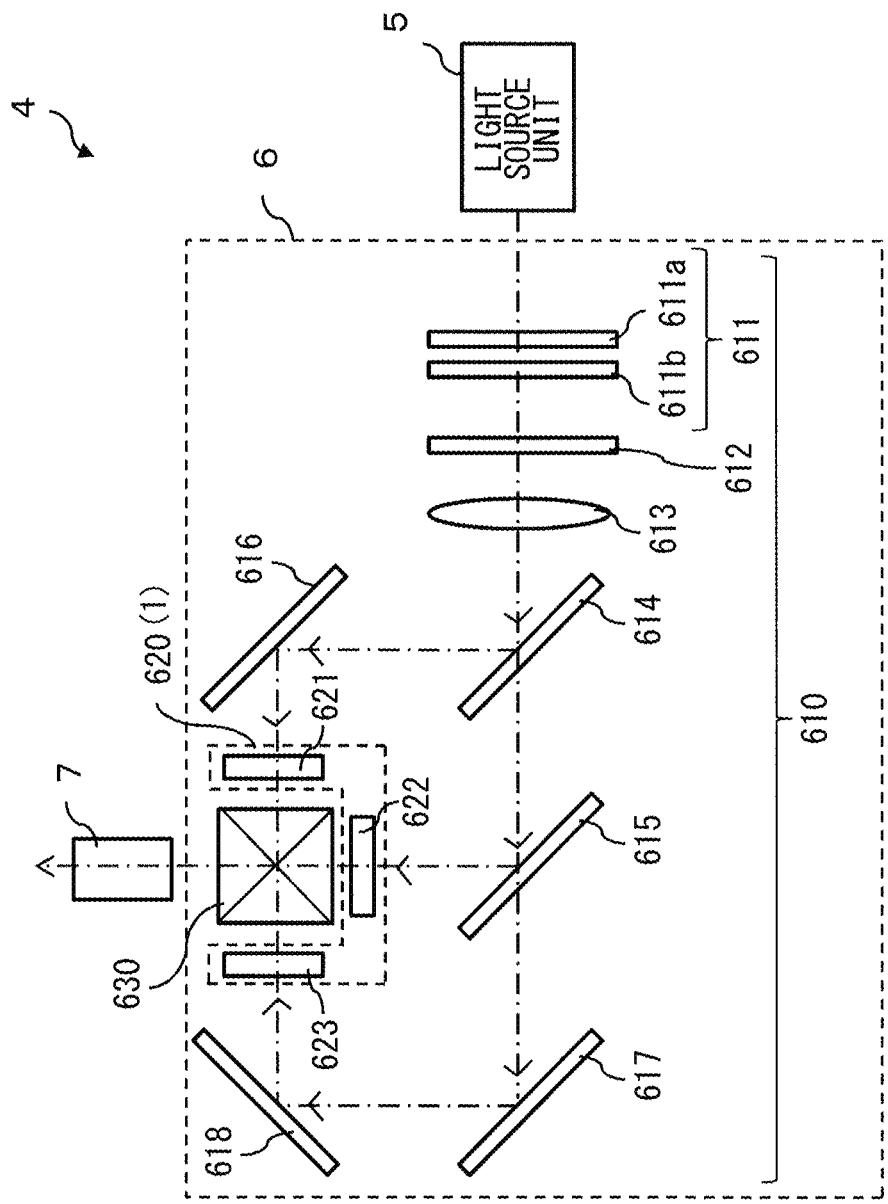
[FIG. 42]

CONTROL CIRCUIT, DISPLAY DEVICE, ELECTRONIC APPARATUS, AND PROJECTION DISPLAY APPARATUS

CROSS REFERENCE TO RELATED APPLICATIONS

This application is a U.S. National Phase of International Patent Application No. PCT/JP2016/065609 filed on May 26, 2016, which claims priority benefit of Japanese Patent Application No. JP 2015-128929 filed in the Japan Patent Office on Jun. 26, 2015. Each of the above-referenced applications is hereby incorporated herein by reference in its entirety.

TECHNICAL FIELD

The disclosure relates to a control circuit, a display device, an electronic apparatus, and a projection display apparatus.

BACKGROUND ART

In a display device including a liquid crystal cell as an electrooptical element, if a DC voltage is continuously applied to the liquid crystal cell for a long time, deterioration of resistivity (a resistance value inherent to a substance) of the liquid crystal, or an afterimage phenomenon called "burning" occurs. Therefore, an AC driving method that inverts a polarity of a signal voltage applied to a pixel electrode of the liquid crystal cell with respect to a potential of a counter electrode of the liquid crystal cell at a predetermined period, is adopted. A well known example of the AC driving method is a field inversion driving method that inverts the polarity of the signal voltage for each field period while fixing a common voltage applied to the counter electrode, or inverts the common voltage in addition to the signal voltage for each field period (see PTL 1).

CITATION LIST

Patent Literature

PTL 1: Japanese Unexamined Patent Application Publication No. 2001-042287

SUMMARY OF INVENTION

In the field inversion driving method, however, potential difference between a source and a drain of a pixel transistor becomes large and a leakage current flows through the pixel transistor in a specific period in one field period. In addition, a period in which a large amount of leakage current flows (hereinafter, referred to as a "leakage period") varies in one screen. More specifically, the leakage period is different among a top, a middle, and a bottom of the screen. Further, the characteristics of the pixel transistor vary for each pixel. Accordingly, since the leakage amount varies not only in the vertical direction of the screen but also for each pixel, shading occurs from a middle to a bottom of the screen as well as a mottled pattern occurs, which deteriorates image quality.

Accordingly, it is desirable to provide a control circuit that makes it possible to significantly suppress deterioration of image quality caused by current leakage in field inversion driving, and a display device, an electronic apparatus, and a projection display apparatus each including the control circuit.

A control circuit according to an embodiment of the disclosure is a control circuit that controls driving of an electrooptical element. The control circuit performs control of active matrix driving by a field inversion driving method to cause a vertical effective display period in one field period to be close to a start time of the one field period upon observation of a waveform of a signal outputted from the control circuit with display resolution of 200 µsec or display resolution lower than display resolution of 200 µsec. The one field period is defined by a vertical start signal.

A display device according to an embodiment of the disclosure includes an electrooptical element, and a control circuit that controls driving of the electrooptical element. The control circuit performs control of active matrix driving by a field inversion driving method to cause a vertical effective display period in one field period to be close to a start time of the one field period upon observation of a waveform of a signal outputted from the control circuit with display resolution of 200 µsec or display resolution lower than display resolution of 200 µsec. The one field period is defined by a vertical start signal.

An electronic apparatus according to an embodiment of the disclosure is provided with a display device. The display device includes an electrooptical element, and a control circuit that controls driving of the electrooptical element. The control circuit performs control of active matrix driving by a field inversion driving method to cause a vertical effective display period in one field period to be close to a start time of the one field period upon observation of a waveform of a signal outputted from the control circuit with display resolution of 200 µsec or display resolution lower than display resolution of 200 µsec. The one field period is defined by a vertical start signal.

A projection display apparatus according to an embodiment of the disclosure includes an illumination optical system, a plurality of electrooptical elements that modulate light from the illumination optical system to generate image light; a control circuit that controls driving of the plurality of electrooptical elements, and a projection optical system that projects the image light generated by the plurality of electrooptical elements. The control circuit performs control of active matrix driving by a field inversion driving method to cause a vertical effective display period in one field period to be close to a start time of the one field period upon observation of a waveform of a signal outputted from the control circuit with display resolution of 200 µsec or display resolution lower than display resolution of 200 µsec. The one field period is defined by a vertical start signal.

In the control circuit, the display device, the electronic apparatus, and the projection display apparatus according to the respective embodiments of the disclosure, the control of the active matrix driving is performed by the field inversion driving method such that the vertical effective display period is close to the start time of one field period upon observation of the waveform of the signal outputted from the control circuit with the display resolution of 200 µsec or the display resolution lower than display resolution of 200 µsec. This uniformizes an in-plane distribution of a leakage amount in one field period, as compared with a case where the control of the active matrix driving is performed by the existing field inversion driving method.

In the control circuit, the display device, the electronic apparatus, and the projection display apparatus according to the respective embodiments of the disclosure, the in-plane distribution of the leakage amount in one field period is more uniformized. This suppresses shading and a mottled pattern. As a result, it is possible to suppress deterioration of image quality caused by the current leakage in the field inversion driving. Note that effects of the technology are not limited to the effects described here. Effects achieved by the technology may be one or more of effects described in the present specification.

BRIEF DESCRIPTION OF DRAWINGS

FIG. 1 is a diagram illustrating an example of a schematic configuration of a display device according to a first embodiment of the disclosure.

FIG. 2 is a diagram illustrating a schematic configuration of a display panel module.

FIG. 3 is a diagram illustrating an example of a circuit configuration of a horizontal driving circuit.

FIG. 4 is a waveform diagram that describes an example of point sequential driving by a controller.

FIG. 5 is a waveform diagram that describes one field period.

FIG. 6 is a waveform diagram that describes one horizontal period.

FIG. 7 is a diagram illustrating another example of the circuit configuration of the horizontal driving circuit.

FIG. 8 is a waveform diagram that describes an example of line sequential driving by the controller.

FIG. 9 is a schematic diagram that describes an example of field inversion driving.

FIG. 10 is a schematic diagram that describes an example of the field inversion driving.

FIG. 11 is a schematic diagram that describes an example of the field inversion driving.

FIG. 12 is a waveform diagram that describes an example of field inversion driving according to a comparative example.

FIG. 13 is a waveform diagram that describes an example of the field inversion driving according to the comparative example.

FIG. 14 is a diagram illustrating an example of shading and a mottled pattern caused by the field inversion driving according to the comparative example.

FIG. 15 is a waveform diagram that describes an example of the field inversion driving according to the comparative example.

FIG. 16 is a waveform diagram that describes an example of field inversion driving according to the present embodiment.

FIG. 17 is a waveform diagram that describes an example of the field inversion driving according to the present embodiment.

FIG. 18 is a diagram illustrating an example of a display screen in the display device according to the present embodiment.

FIG. 19A is a waveform diagram that describes an example of an effective display period and a blanking period.

FIG. 19B is an enlarged view of the waveform diagram of FIG. 19A.

FIG. 20A is a waveform diagram that describes an example of the effective display period and the blanking period.

FIG. 20B is an enlarged view of the waveform diagram of FIG. 20A.

FIGS. 22A and 22B are schematic diagrams that describes an example of the effective display period and the blanking period.

FIGS. 28A and 28B are schematic diagrams that describes an example of the effective display period and the blanking period.

FIGS. 30A, 30B, and 30C are schematic diagrams that describes an example of the effective display period and the blanking period.

FIGS. 31A, 31B, 31C, and 31D are schematic diagrams that describes an example of the effective display period and the blanking period.

FIG. 33 is a diagram illustrating an example of the display screen in the display according to the present embodiment.

FIG. 35 is a diagram illustrating a modification of the schematic configuration of the display device of FIG. 1.

FIG. 36 is a diagram illustrating an example of a schematic configuration of a display panel module in the display device of FIG. 35.

FIG. 37 is a diagram illustrating an example of a circuit configuration of a horizontal driving circuit and a precharge circuit.

FIG. 38 is a diagram illustrating an example of the circuit configuration of the horizontal driving circuit and the precharge circuit.

FIG. 39 is a waveform diagram that describes an example of the field inversion driving.

FIG. 40 is a diagram illustrating an example of a perspective configuration of an electronic apparatus according to a second embodiment of the disclosure.

FIG. 41 is a diagram illustrating an example of a perspective configuration of an electronic apparatus according to a third embodiment of the disclosure.

FIG. 42 is a diagram illustrating an example of a schematic configuration of a projector according to a fourth embodiment of the disclosure.

DESCRIPTION OF EMBODIMENTS

Figures 21A, 21B:
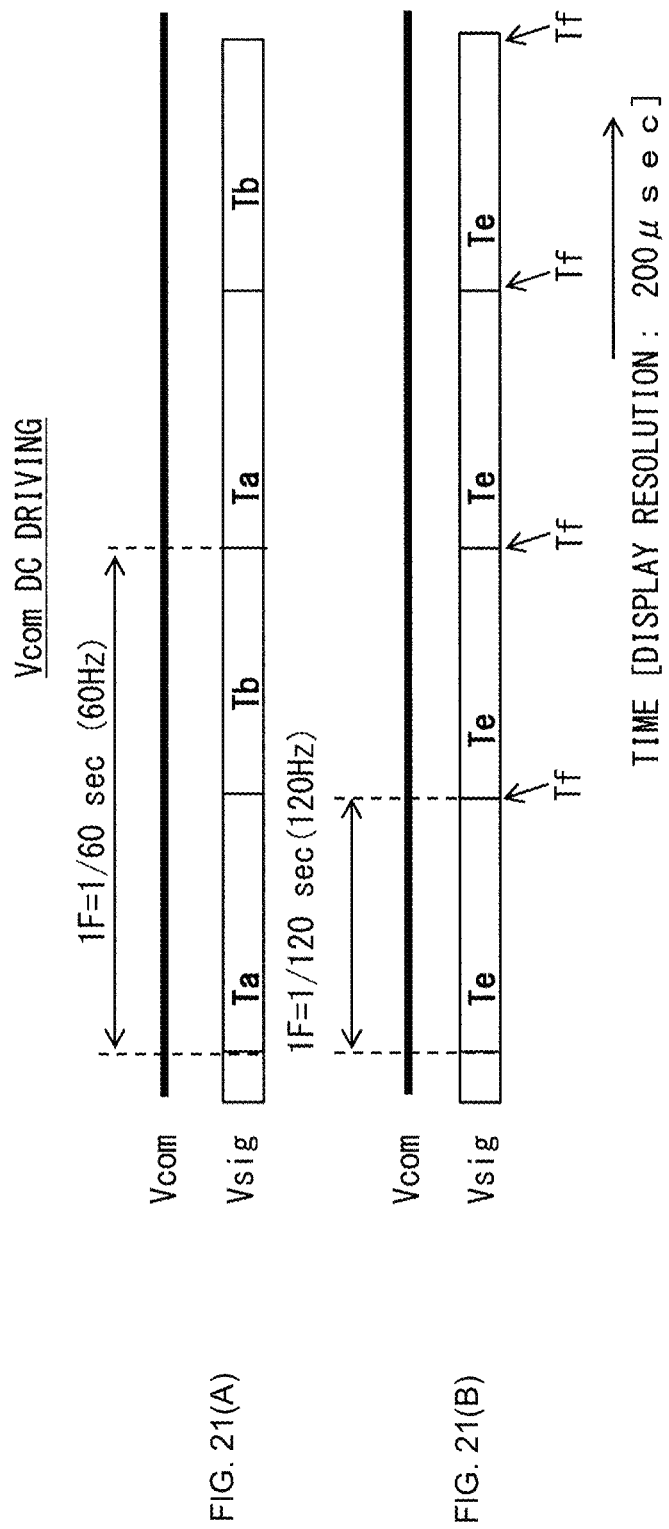
FIGS. 21A and 21B are schematic diagrams that describes an example of the effective display period and the blanking period.

Some embodiments of the disclosure are described in detail below with reference to drawings. Note that description is given in the following order.

1. First embodiment (display device)
An example in which a precharge circuit is omitted (FIG. 1 to FIG. 33)
    2. Modifications of first embodiment (display device)
        Modification B: an example in which refresh writing is performed during 1F (FIGS. 34A, 34B, and 35)
        Modification A: an example in which a precharge circuit is provided (FIG. 36 to FIG. 39)
3. Third Embodiment (Electronic Apparatus)
    An example in which the display device according to any of the first embodiment and the modifications thereof is used in an electronic apparatus (FIG. 40)
4. Fourth Embodiment (Electronic Apparatus)
    An example in which the display device according to any of the first embodiment and the modifications thereof is used in an electronic apparatus (FIG. 41)
5. Fifth Embodiment (Projector)
    An example in which the display device according to any of the first embodiment and the modifications thereof is used in a projector (FIG. 42)

1. First Embodiment

[Configuration]

FIG. 1 illustrates an example of a schematic configuration of a display device 1 according to a first embodiment of the disclosure. The display device 1 is applicable as a light valve of a three-plate projector (a projection display apparatus). The display device 1 includes, for example, a pixel array section 10, a controller 20, and a liquid crystal driver 30. The pixel array section 10 may be of transmissive type or of reflective type. Note that in a case of the transmissive pixel array section 10, the display device 1 may include an unillustrated light source behind the pixel array section 10 as necessary. The display device 1 corresponds to a specific example of a "display device" in the disclosure. The controller 20 corresponds to a specific example of a "control circuit" in the disclosure.

[Pixel Array Section 10]

The pixel array section 10 has, for example, transmittance characteristics or reflectance characteristics of normally black. The normally black used herein indicates optical characteristics in which transmittance or reflectance becomes minimum to perform black display when a voltage is not applied. Note that the pixel array section 10 may have, for example, transmittance characteristics or reflectance characteristics of normally white. The normally white used herein indicates optical characteristics in which transmittance or reflectance becomes maximum to perform white display when a voltage is not applied. The pixel array section 10 generates image light by electrically changing a polarization state of light by voltage application.

FIG. 2 illustrates an example of a schematic configuration of a display panel module 40. The display device 1 includes the display panel module 40. The display panel module 40 includes a display panel 41 in which the pixel array section 10 and the liquid crystal driver 30 are provided on a substrate configured of, for example, a glass plate or a resin plate. The display panel module 40 further includes, for example, a flexible printed circuit (FPC) 42 and a control substrate 43. The FPC 42 is coupled to the liquid crystal driver 30 on the display panel 41, and the control substrate 43 is coupled to the FPC 42. The control substrate 43 controls the pixel array section 10 through the liquid crystal driver 30, and includes, for example, the controller 20. The controller 20 includes, for example, an IC. Note that the controller 20 may be provided on the FPC 42 or on the substrate of the display panel module 40.

The pixel array section 10 includes a plurality of scan lines WS extending in a row direction, a plurality of signal lines Sig extending in a column direction, and a plurality of pixels 11 that are provided one by one at respective intersections of the scan lines WS and the signal lines Sig. Each of the pixels 11 includes, for example, a liquid crystal cell CL, a pixel transistor Tr, and a capacitor Cs. The pixel transistor Tr samples a voltage of the corresponding signal line Sig and writes the voltage in the liquid crystal cell CL, on the basis of the signal provided from the corresponding scan line WS. The capacitor Cs is coupled in parallel to the liquid crystal cell CL.

The pixel transistor Tr includes, for example, a thin film transistor (TFT). The liquid crystal cell CL includes, for example, a liquid crystal layer, a pixel electrode, and a counter electrode. The pixel electrode and the counter electrode sandwich the liquid crystal layer. The liquid crystal cell CL may further include, for example, a polarizer. In the liquid crystal cell CL, the pixel electrode is coupled to a source or a drain of the pixel transistor Tr, and the counter electrode is coupled to a VCOM circuit 24 described later. Examples of a display state of the liquid crystal cell CL include a twisted nematic (TN) mode, a vertical alignment (VA) mode, an in plane switching (IPS) mode, a fringe field switching (FFS) mode, a super twisted nematic (STN) mode, and an electrically controlled birefringence (ECB) mode. In the capacitor Cs, one end is coupled to the pixel electrode of the liquid crystal cell CL, and the other end is coupled to the pixel electrode of the liquid crystal cell CL or a site, having a potential different from a potential of the pixel electrode, of the liquid crystal cell CL.

[Liquid Crystal Driver 30]

The liquid crystal driver 30 performs active matrix driving on the respective pixels 11 to cause the pixel array section 10 to generate image light based on an image signal provided from outside. The liquid crystal driver 30 includes a vertical driving circuit 31 and a horizontal driving circuit 32. The vertical driving circuit 31 is coupled to the plurality of scan lines WS, and the horizontal driving circuit 32 is coupled to the plurality of signal lines.

FIG. 3 illustrates an example of a circuit configuration of the horizontal driving circuit 32. FIG. 4 is a waveform diagram that describes an example of point sequential driving by the controller 20. In FIG. 3 and FIG. 4, the plurality of signal lines Sig are divided into a plurality of groups (for example, 41 units), and a plurality (for example, 48 phases) of signal lines Sig are assigned to each of the groups. In other words, in FIG. 3 and FIG. 4, 48 phases×41 units=1968 signal lines Sig are provided. Note that the configuration of the horizontal driving circuit 32 is not limited to the configuration illustrated in FIG. 3.

The horizontal driving circuit 32 operates on the basis of a control signal supplied from the controller 20, and outputs, to the pixel array section 10, a signal voltage Vsig for one line through the signal lines Sig in parallel. The signal voltage Vsig has a crest value or a pulse width in accordance with a gray-scale of an image signal DA (described later) provided from outside. The vertical driving circuit 31 operates on the basis of a control signal supplied from the controller 20, and outputs a drive pulse that line-sequentially scans the respective pixels 11, to the pixel array section 10 through the scan lines WS in parallel.

The horizontal driving circuit 32 includes, for example, a plurality of shift registers SR (SR(a1), SR(a2), . . . , SR(a41)) and a plurality of switch elements SWa. The plurality of shift registers SR (SR(a1), SR(a2), . . . , SR(a41)) are assigned to the groups of the signal lines Sig one by one. The plurality of switch elements SWa are assigned to the signal lines Sig one by one in each group of the signal lines Sig. In each of the shift registers SR(a1), SR(a2), . . . , SR(a41), an output end is coupled to an on-off control terminal of each of the switch elements SWa in the corresponding group, and an input end is coupled to the controller 20 through the FPC 42. In each of the switch elements SWa, one end is coupled to the corresponding signal line Sig one by one, and the other end is coupled to the controller 20 through the FPC 42. For example, control signals SR are sequentially outputted from the respective shift registers SR to the on-off control terminals of the respective switch elements SWa in the corresponding group, on the basis of the control signal supplied from the controller 20, which causes the horizontal driving circuit 32 to sequentially output the signal voltage Vsig from each of the groups to the corresponding signal lines Sig.

[Controller 20]

The controller 20 performs control of active matrix driving of the respective pixels 11 by a field inversion driving method, with respect to the liquid crystal driver 30. The field inversion driving method is described in detail later. The controller 20 includes a signal processing circuit 31, a timing generation circuit 32, an inversion circuit 33, the VCOM circuit 34, and a power generation circuit 25.

For example, the signal processing circuit 31 converts a digital image signal Din provided from outside, into an analog digital signal DA for the pixel array section 10, and provides the converted image signal DA to the inversion circuit 33. For example, the signal processing circuit 31 further separates a synchronization signal Ts from the image signal Din, and provides the separated synchronization signal Ts to the timing generation circuit 32. For example, the timing generation circuit 32 forms a horizontal start signal HST and a horizontal clock signal HCK that are synchronized with the synchronization signal Ts, and provides the horizontal start signal HST and the horizontal clock signal HCK to the horizontal driving circuit 32. For example, the timing generation circuit 32 further forms a vertical start signal VST and a vertical clock signal VCK that are synchronized with the synchronization signal Ts, and provides the vertical start signal VST and the vertical clock signal VCK to the vertical driving circuit 31. For example, the timing generation circuit 32 further forms an inversion control pulse synchronized with the synchronization signal Ts and provides the inversion control pulse to the inversion circuit 33. For example, the timing generation circuit 32 further forms the vertical clock signal VCK synchronized with the synchronization signal Ts, and provides the vertical clock signal VCK to the VCOM circuit 34. The inversion circuit 33 performs polarity inversion operation corresponding to the inversion control pulse. The inversion circuit 33 forms the signal voltage Vsig that is inverted in polarity for each field period, from the image signal DA. The inversion circuit 33 provides the formed signal voltage Vsig to the horizontal driving circuit 32. The power generation circuit 25 generates voltages necessary for the signal processing circuit 21, the VCOM circuit 24, and other circuits, and supplies the voltages to the signal processing circuit 21 and the VCOM circuit 24.

Here, for example, one field period is a period defined by the vertical start signal VST, as illustrated in FIG. 5. The start time of one field period corresponds to a rising time of the vertical start signal VST, and the end time of one field period corresponds to a rising time of the vertical start signal VST that is first generated after one field period is started.

Note that one field period may be a period defined by a pulse waveform of a common voltage Vcom. In this case, one field period corresponds to a period from a rising time to a falling time of the common voltage Vcom, or a period from the falling time to the rising time of the common voltage Vcom.

One field period includes an effective display period Ta in which the signal voltage Vsig is applied to the pixel array section 10, and a blanking period Tb that is provided before or after, or both before and after the effective display period Ta. In the present embodiment, only one effective display period Ta is provided in one field period. In the effective display period Ta, the signal voltages Vsig for all lines are sequentially outputted to the respective signal lines Sig from the horizontal driving circuit 32, by each signal voltage Vsig of one line, in synchronization with the vertical clock signal VCK. The blanking period Tb is a period in which the image is not displayed on the pixel array section 10 and various signal processing are performed.

For example, the horizontal start signal HST defines one horizontal period (1H), as illustrated in FIG. 6. The start time of one horizontal period (1H) corresponds to a rising time of the horizontal start signal HST, and the end time of one horizontal period corresponds to a rising time of the horizontal start signal HST that is first generated after one horizontal period is started. Each one horizontal period within the effective display period Ta includes an effective display period Tc in which the signal voltage Vsig is applied to the pixel array section 10, and a blanking period Td that is provided before or after, or both before and after the effective display period Tc. In the effective display period Tc, the signal voltage Vsig of one line is outputted to the corresponding signal lines Sig from the horizontal driving circuit 32 at a time in synchronization with the horizontal clock signal HCK, or sequentially outputted for each group of the signal lines Sig. The blanking period Td is a period in which the image is not displayed on the pixel array section 10.

The VCOM circuit 34 generates the predetermined common voltage Vcom and applies the common voltage Vcom to the counter electrode of the liquid crystal cell CL. For example, in a case of performing DC driving, the VCOM circuit 34 makes the common voltage Vcom constant and applies the common voltage Vcom to the counter electrode of the liquid crystal cell CL. For example, in a case of performing AC driving, the VCOM circuit 34 applies the common voltage Vcom that is changed in pulse in synchronization with the vertical start signal VST, to the counter electrode of the liquid crystal cell CL. At this time, the VCOM circuit 34 forms the common voltage Vcom that is inverted in polarity for each field, and applies the formed common voltage Vcom to the counter electrode of the liquid crystal cell CL.

FIG. 7 illustrates another example of the circuit configuration of the horizontal driving circuit 32. FIG. 8 is a waveform diagram that describes an example of line sequential driving by the controller 20. In FIG. 7 and FIG. 8, the plurality of signal lines Sig are divided into a plurality of groups (for example, 41 cells), and a plurality (for example, 48 channels) of signal lines Sig are assigned to each of the groups. In other words, in FIG. 7 and FIG. 8, 48 channels×41 cells=1986 signal lines Sig are provided. Note that the configuration of the horizontal driving circuit 32 is not limited to the configuration illustrated in FIG. 5.

For example, the horizontal driving circuit 32 includes a plurality of selection lines SEL (SEL(1), SEL(2), . . . , SEL(41)) and a plurality of switch elements SWb. The plurality of selection lines SEL (SEL(1), SEL(2), . . . , SEL(41)) are assigned to the groups of the signal lines Sig one by one. The plurality of switch elements SWb are assigned to the signal lines Sig one by one in each of the groups of the signal lines Sig. In a case where the plurality of switch elements SWb that are different in corresponding selection line SEL from one another are grouped as one switch group, and all of the switches SWb are assigned to any of the switch groups, in each of the switch groups, one ends are coupled to the signal lines different from one another, and the other ends are coupled to a common wiring. The common wirings are assigned to the respective switch groups one by one, and are electrically separated from one another. Each of the common wirings is coupled to the controller 20 through the FPC 42. For example, the switches SWb are sequentially turned on for each of the groups of the signal lines Sig, on the basis of the control signal supplied from the controller 20, which causes the horizontal driving circuit 32 to sequentially output the signal voltage Vsig to each of the groups of the signal lines Sig.

[Field Inversion Driving]

FIG. 9 is a schematic diagram that describes an example of the field inversion driving according to the present embodiment. The field inversion driving indicates driving in which the signal voltage Vsig that is inverted in polarity from the common voltage Vcom of the liquid crystal cell CL for each field period (1 F) is applied to the liquid crystal cell CL. In FIG. 9, a symbol "+" indicates that the polarity of the signal voltage Vsig is positive with respect to the common voltage Vcom. In FIG. 9, a symbol "−" indicates that the polarity of the signal voltage Vsig is negative with respect to the common voltage Vcom. In other words, the symbols "+" and "−" indicate relative magnitude relationship of the signal voltage Vsig with respect to the common voltage Vcom.

In FIG. 9, time elapses in a counterclockwise direction from upper left in FIG. 9, and time elapses in order of times t1, t2, t3, t4, t5, and t6. A period from time t1 to time t4 corresponds to one field period, and a period from time t4 to time t1 corresponds to one field period. First, at time t1, the polarity of the signal voltage Vsig with respect to the common voltage Vcom is positive in the entire screen. At time t2, the polarity of the signal voltage Vsig with respect to the common voltage Vcom is changed from positive to negative at the uppermost line in the screen. At time t3, the polarity of the signal voltage Vsig with respect to the common voltage Vcom is changed from positive to negative in second and third lines from the top in the screen. At time t4, the polarity of the signal voltage Vsig with respect to the common voltage Vcom is negative in the entire screen. At time t5, the polarity of the signal voltage Vsig with respect to the common voltage Vcom is changed from negative to positive in the uppermost line in the screen. At time t6, the polarity of the signal voltage Vsig with respect to the common voltage Vcom is changed from negative to positive in the second and third lines from the top in the screen. As described above, the change of the polarity of the signal voltage Vsig with respect to the common voltage Vcom from positive to negative or from negative to positive in the entire screen for each field period is referred to as the field inversion driving.

FIG. 10 is a schematic diagram that describes an example of the field inversion driving according to the present embodiment. For example, the controller 20 may perform point sequential driving constantly toward a specific direction in a horizontal direction in performing the control of the field inversion driving, as illustrated by arrows in FIG. 10.

More specifically, first, at time t1, the controller 20 controls a pixel voltage Vpix and performs the point sequential driving from left to right in the horizontal direction such that the polarity of the signal voltage Vsig with respect to the common voltage Vcom becomes positive in the entire screen. At time t2, the controller 20 controls the pixel voltage Vpix and performs the point sequential driving from left to right in the horizontal direction such that the polarity of the signal voltage Vsig with respect to the common voltage Vcom is changed from positive to negative in the uppermost line in the screen. At time t3, the controller 20 controls the pixel voltage Vpix and performs the point sequential driving from left to right in the horizontal direction such that the polarity of the signal voltage Vsig with respect to the common voltage Vcom is changed from positive to negative in the second and third lines from the top in the screen. At time t4, the controller 20 controls the pixel voltage Vpix and performs the point sequential driving from left to right in the horizontal direction in the first and second lines from the bottom of the screen such that the polarity of the signal voltage Vsig with respect to the common voltage Vcom becomes negative in the entire screen. At time t5, the controller 20 controls the pixel voltage Vpix and performs the point sequential driving from left to right in the horizontal direction such that the polarity of the signal voltage Vsig with respect to the common voltage Vcom is changed from negative to positive in the uppermost line in the screen. At time t6, the controller 20 controls the pixel voltage Vpix and performs the point sequential driving from left to right in the horizontal direction such that the polarity of the signal voltage Vsig with respect to the common voltage Vcom is changed from negative to positive in the second and third lines from the top in the screen.

FIG. 11 is a schematic diagram that describes an example of the field inversion driving according to the present embodiment. For example, the controller 20 may change the direction of the point sequential driving in the horizontal direction for each field period in performing the control of the field inversion driving, as illustrated by arrows in FIG. 11.

More specifically, first, at time t1, the controller 20 controls the pixel voltage Vpix and performs the point sequential driving from left to right in the horizontal direction such that the polarity of the signal voltage Vsig with respect to the common voltage Vcom becomes positive in the entire screen. At time t2, the controller 20 controls the pixel voltage Vpix and performs the point sequential driving from right to left in the horizontal direction such that the polarity of the signal voltage Vsig with respect to the common voltage Vcom is changed from positive to negative in the uppermost line in the screen. At time t3, the controller 20 controls the pixel voltage Vpix and performs the point sequential driving from right to left in the horizontal direction such that the polarity of the signal voltage Vsig with respect to the common voltage Vcom is changed from positive to negative in the second and third lines from the top in the screen. At time t4, the controller 20 controls the pixel voltage Vpix and performs the point sequential driving from right to left in the horizontal direction in the first and second lines from the bottom of the screen such that the polarity of the signal voltage Vsig with respect to the common voltage Vcom becomes negative in the entire screen. At time t5, the controller 20 controls the pixel voltage Vpix and performs the point sequential driving from left to right in the horizontal direction such that the polarity of the signal voltage Vsig with respect to the common voltage Vcom is changed from negative to positive in the uppermost line in the screen.

At time t6, the controller 20 controls the pixel voltage Vpix and performs the point sequential driving from left to right in the horizontal direction such that the polarity of the signal voltage Vsig with respect to the common voltage Vcom is changed from negative to positive in the second and third lines from the top in the screen.

Next, the field inversion driving according to the present embodiment is described through comparison with field inversion driving according to a comparative example. The field inversion driving according to the comparative example is first described, and the field inversion driving according to the present embodiment is then described.

FIG. 12 and FIG. 13 are waveform diagrams that describe an example of the field inversion driving according to the comparative example. FIG. 12 is a waveform diagram in a case where a controller according to the comparative example performs control for DC driving of the counter electrode of the liquid crystal cell. FIG. 13 is a waveform diagram in a case where the controller according to the comparative example performs control for AC driving of the counter electrode of the liquid crystal cell.

In three waveform diagrams on left side in each of FIG. 12 and FIG. 13, a horizontal axis indicates time, and a vertical axis indicates voltage. In three waveform diagrams on right side in each of FIG. 12 and FIG. 13, a horizontal axis indicates time, and a vertical axis indicates the pixel voltage Vpix (=the signal voltage Vsig−the common voltage Vcom). In each of FIG. 12 and FIG. 13, two diagrams at the top are waveform diagrams of a signal applied to a pixel 11 that is located at a position "11a" in FIG. 9 to FIG. 11. In each of FIG. 12 and FIG. 13, two diagrams at the middle are waveform diagrams of a signal applied to a pixel 11 that is located at a position "11b" in FIG. 9 to FIG. 11. In each of FIG. 12 and FIG. 13, two diagrams at the bottom are waveform diagrams of a signal applied to a pixel 11 that is located at a position "11c" in FIG. 9 to FIG. 11.

When the polarity of the signal voltage Vsig with respect to the common voltage Vcom is changed from positive to negative (the time shifts from time t1 to time t2) in the pixel 11a at the top of the screen, large potential difference occurs between the source and the drain of the pixel transistor Tr in the pixel 11b at the middle of the screen and the pixel 11c at the bottom of the screen. Therefore, a leakage current flows through the pixel transistor Tr in each of the pixels b and 11c. At this time, the pixel voltage Vpix in each of the pixels 11b and 11c is gradually decreased by the current leakage in the pixel transistor Tr with time (see a circled part in the drawing). A leakage period is longer in the pixel 11c at the bottom of the screen than in the pixel 11b at the middle of the screen, and the leakage amount is larger in the pixel 11c at the bottom of the screen than in the pixel 11b at the middle of the screen by the length of the leakage period longer than the pixel 11b. In particular, in the pixel 11c at the bottom of the screen, the current leakage occurs immediately after the pixel voltage Vpix is set to a desired voltage, and the leakage amount is excessively large. As described above, in the comparative example, the leakage period and the leakage amount are largely different among the top, the middle, and the bottom of the screen. Further, the characteristics of the pixel transistor Tr are varied for each pixel 11. Therefore, the leakage amount is different not only in the vertical direction of the screen but also among the pixels 11. As a result, for example, as illustrated in FIG. 14, shading as well as a mottled pattern occur from the middle to the bottom on the screen, which deteriorates image quality.

Next, the cause of such an issue is considered. FIG. 15 illustrates an example of an effective display period Te and a blanking period Tf in the comparative example. In FIG. 15, a horizontal axis indicates time. In FIG. 15, display resolution of the horizontal axis is 400 μsec (display resolution lower than display resolution of 200 μsec) when one field period is 1/60 sec (≤16.7 msec). In FIG. 15, the display resolution of the horizontal axis is 200 μsec in a case where one field period is 1/120 sec (≈8.3 msec). In FIG. 15, the display resolution of the horizontal axis is 200 μsec in a case where one field period is 1/180 sec (≈5.6 msec). In addition, in FIG. 15, the display resolution of the horizontal axis is 100 μsec in a case where one field period is 1/240 sec (≈4.2 msec). In FIG. 15, the display resolution of the horizontal axis is 500 μsec (the display resolution lower than display resolution of 200 μsec) in a case where one field period is 1/50 sec (≈20.0 msec). In FIG. 15, the display resolution of the horizontal axis is 300 μsec (the display resolution lower than display resolution of 200 μsec) in a case where one field period is 1/100 sec (≈20.0 msec). In FIG. 15, the display resolution of the horizontal axis is 200 μsec in a case where one field period is 1/150 sec (≈6.7 msec). In addition, in FIG. 15, the display resolution of the horizontal axis is 200 μsec in a case where one field period is 1/200 sec (≈6.7 msec).

The display resolution indicates identification ability of waveform in a display in a case where the waveform is measured by an oscilloscope, etc. and displayed on the display. For example, in a case where the display resolution of the horizontal axis is 100 μsec, a pulse of less than 100 μsec is represented by one line. In addition, for example, in a case where the display resolution of the horizontal axis is 100 μsec, two pulses having an interval less than 100 μsec are represented by one line or by two pulses without an interval.

The effective display period Te normally occupies most of one field period in terms of high luminance and securement of a timing margin, and typically occupies about 98% of one field period. In other words, the blanking period Tf occupies about 2% of one field period. Accordingly, in a case where one field period is 1/60 sec, the blanking period Tf in the entire one field period is about 333 μsec. In a case where one field period is 1/120 sec, the blanking period Tf in the entire one field period is about 167 μsec. In a case where one field period is 1/180 sec, the blanking period Tf in the entire one field period is about 111 μsec. In addition, in a case where one field period is 1/240 sec, the blanking period Tf in the entire one field period is about 83 μsec. In a case where one field period is 1/50 sec, the blanking period Tf in the entire one field period is about 400 μsec. In a case where one field period is 1/100 sec, the blanking period Tf of the entire one field period is about 200 μsec. In a case where one field period is 1/150 sec, the blanking period Tf in the entire one field period is about 133 μsec. In addition, in a case where one field period is 1/200 sec, the blanking period Tf in the entire one field period is about 100 μsec.

Accordingly, in a case where the display resolution of the horizontal axis is 400 μsec on condition that one field period is 1/60 sec, the blanking period Tf is less than the display resolution of the horizontal axis. Therefore, in this case, the blanking period Tf is represented by one line, and the two effective display periods Te having an interval of about 333 μsec are represented as two effective display periods Te without an interval. In addition, in a case where the display resolution of the horizontal axis is 200 μsec on condition that one field period is 1/120 sec, the blanking period Tf is less than the display resolution of the horizontal axis. Therefore, in this case, the blanking period Tf is represented by one line, and the two effective display periods Te having an interval of about 167 μsec are represented as two effective display periods Te without an interval. Further, in a case where the display resolution of the horizontal axis is 200 µsec on condition that one field period is ¹⁄₁₈₀ sec, the blanking period Tf is less than the display resolution of the horizontal axis. Therefore, in this case, the blanking period Tf is represented by one line, and the two effective display periods Te having an interval of about 111 µsec are represented as two effective display periods Te without an interval. Moreover, in a case where the display resolution of the horizontal axis is 100 µsec on condition that one field period is ¹⁄₂₄₀ sec, the blanking period Tf is less than the display resolution of the horizontal axis. Therefore, in this case, the blanking period Tf is represented by one line, and the two effective display periods Te having an interval of about 83 µsec are represented as two effective display periods Te without an interval.

In addition, in a case where the display resolution of the horizontal axis is 500 µsec on condition that one field period is about ¹⁄₅₀ sec, the blanking period Tf is less than the display resolution of the horizontal axis. Therefore, in this case, the blanking period Tf is represented by one line, and the two effective display periods Te having an interval of about 400 µsec are represented as two effective display periods Te without an interval. Further, in a case where the display resolution of the horizontal axis is 300 µsec on condition that one field period is about ¹⁄₁₀₀ sec, the blanking period Tf is less than the display resolution of the horizontal axis. Therefore, in this case, the blanking period Tf is represented by one line, and the two effective display periods Te having an interval of about 200 µsec are represented as two effective display periods Te without an interval. Furthermore, in a case where the display resolution of the horizontal axis is 200 µsec on condition that one field period is about ¹⁄₁₅₀ sec, the blanking period Tf is less than the display resolution of the horizontal axis. Therefore, in this case, the blanking period Tf is represented by one line, and the two effective display periods Te having an interval of about 133 µsec are represented as two effective display periods Te without an interval. Moreover, in a case where the display resolution of the horizontal axis is 200 µsec on condition that one field period is about ¹⁄₂₀₀ sec, the blanking period Tf is less than the display resolution of the horizontal axis. Therefore, in this case, the blanking period Tf is represented by one line, and the two effective display periods Te having an interval of about 100 µsec are represented as two effective display periods Te without an interval.

As described above, in the comparative example, the ratio of the blanking period Tf to the effective display period Te is extremely small. Accordingly, the polarity of the signal voltage Vsig with respect to the common voltage Vcom is changed from negative to positive immediately after the desired pixel voltage Vpix is applied to the lowermost pixels 11. As a result, shading as well as a mottled pattern occur from the middle to the bottom of the screen, which deteriorates image quality.

Next, the field inversion driving according to the present embodiment is described. FIG. 16 and FIG. 17 are waveform diagrams that describe an example of the field inversion driving according to the present embodiment. FIG. 16 is a waveform diagram in a case where the controller 20 according to the present embodiment performs control for DC driving of the counter electrode of the liquid crystal cell CL. FIG. 17 is a waveform diagram in a case where the controller 20 according to the present embodiment performs control for AC driving of the counter electrode of the liquid crystal cell CL.

In three waveform diagrams on left side in each of FIG. 16 and FIG. 17, a horizontal axis indicates time, and a vertical axis indicates voltage. In three waveform diagrams on right side in each of FIG. 16 and FIG. 17, a horizontal axis indicates time, and a vertical axis indicates the pixel voltage Vpix (=the signal voltage Vsig−the common voltage Vcom). In each of FIG. 16 and FIG. 17, two diagrams at the top are waveform diagrams of a signal applied to the pixel 11 that is located at the position "11a" in FIG. 9 to FIG. 11. In each of FIG. 16 and FIG. 17, two diagrams at the middle are waveform diagrams of a signal applied to the pixel 11 that is located at the position "11b" in FIG. 9 to FIG. 11. In each of FIG. 16 and FIG. 17, two diagrams at the bottom are waveform diagrams of a signal applied to the pixel 11 that is located at the position "11c" in FIG. 9 to FIG. 11.

In the present embodiment, the controller 20 performs control of the active matrix driving by the field inversion driving method such that a scanning speed in the vertical direction becomes higher than a scanning speed in the vertical direction according to the comparative example, in each field period. Therefore, the polarity of the signal voltage Vsig with respect to the common voltage Vcom is changed from negative to positive after a certain time elapses after the desired pixel voltage Vpix is applied to the lowermost pixels 11. As a result, difference in the leakage period and difference in the leakage amount among the top, the middle, and the bottom of the screen become lower than those in the comparative example. Accordingly, for example, a region where shading and a mottled pattern occur is shifted to the lower side of the screen as compared with the comparative example, and the shading and the mottled pattern become inconspicuous as compared with the comparative example, as illustrated in FIG. 18.

Next, the scanning speed in the vertical direction in each field period is exemplified. FIG. 19A illustrates an example of the effective display period Te and the blanking period Tf in a case where the controller 20 according to the present embodiment performs DC driving on the counter electrode of the liquid crystal cell CL. In other words, in FIG. 19A, the controller 20 performs the control of the field inversion driving while fixing the potential of the common voltage Vcom. FIG. 19B is an enlarged waveform diagram of FIG. 19A. FIG. 20A illustrates an example of the effective display period Te and the blanking period Tf in a case where the controller 20 according to the present embodiment performs AC driving on the counter electrode of the liquid crystal cell CL. In other words, in FIG. 20A, the controller 20 so performs the control of the field inversion driving as to vary the common voltage Vcom for each field period. FIG. 20B is an enlarged waveform diagram of FIG. 20A. In FIG. 19A, FIG. 19B, FIG. 20A, and FIG. 20B, a horizontal axis indicates time. In FIG. 19A and FIG. 20A, display resolution of the horizontal axis is 400 µsec (the display resolution lower than display resolution of 200 µsec) in a case where one field period is ¹⁄₆₀ sec. In addition, in FIG. 19A and FIG. 20A, the display resolution of the horizontal axis is 200 µsec in a case where one field period is ¹⁄₁₂₀ sec. Further, in FIG. 19A and FIG. 20A, the display resolution of the horizontal axis is 200 µsec in a case where one field period is ¹⁄₁₈₀ sec. Further, in FIG. 19A and FIG. 20A, the display resolution of the horizontal axis is 100 µsec in a case where one field period is ¹⁄₂₄₀ sec. Furthermore, in FIG. 19A and FIG. 20A, the display resolution of the horizontal axis is 500 µsec (the display resolution lower than display resolution of 200 µsec) in a case where one field period is ¹⁄₅₀ sec. Moreover, in FIG. 19A and FIG. 20A, the display resolution of the horizontal axis is 300 µsec (the display resolution lower than display resolution of 200 μsec) in a case where one field period is 1/100 sec. Further, in FIG. 19A and FIG. 20A, the display resolution of the horizontal axis is 200 μsec in a case where one field period is 1/150 sec. Furthermore, in FIG. 19A and FIG. 20A, the display resolution of the horizontal axis is 200 μsec in a case where one field period is 1/200 sec. In FIG. 19B and FIG. 20B, the display resolution of the horizontal axis is 1 μsec. In addition, in FIG. 20A and FIG. 20B, a period from a rising time to a falling time of the common voltage Vcom, or a period from the falling time to the rising time of the common voltage Vcom corresponds to one field period.

In the present embodiment, the controller 20 performs the control of the active matrix driving by the field inversion driving method such that the effective display period Ta is close to the start time of one field period. Therefore, in each field period, the scanning speed in the vertical direction is higher than the scanning speed in the vertical direction according to the comparative example. As a result, the effective display period Ta becomes shorter than the effective display period Te, and the blanking period Tb becomes longer than 2% of one field period.

In a case where one field period is 1/60 sec and the waveform of the signal outputted from the controller 20 is observed with the display resolution of 400 μsec (the display resolution lower than display resolution of 200 μsec), the controller 20 performs the control of the active matrix driving by the field inversion driving method such that the effective display period Ta is close to the starting time of one field period. More specifically, in the case where one field period is 1/60 sec, the controller 20 performs the control of the active matrix driving by the field inversion driving method such that the blanking period Tb in one field period becomes longer than 400 μsec.

For example, in the case where one field period is 1/60 sec, the controller 20 may perform the control of the active matrix driving by the field inversion driving method such that the blanking period Tb subsequent to the effective display period Ta becomes 1/120 μsec (1/2 of one field period) or longer, as illustrated in FIG. 21(A) and FIG. 22(A). At this time, in the effective display period Ta, the timing at which the signal voltage Vsig is outputted from the horizontal driving circuit 32 to each of the signal lines Sig may be coincident with, for example, the timing at which the signal voltage Vsig is outputted from the horizontal driving circuit 32 to each of the signal lines Sig in a case where one field period is 1/120 sec and the effective display period Te is substantially equal to one field period (see FIG. 21(B) and FIG. 22(B)).

Figure 23A:
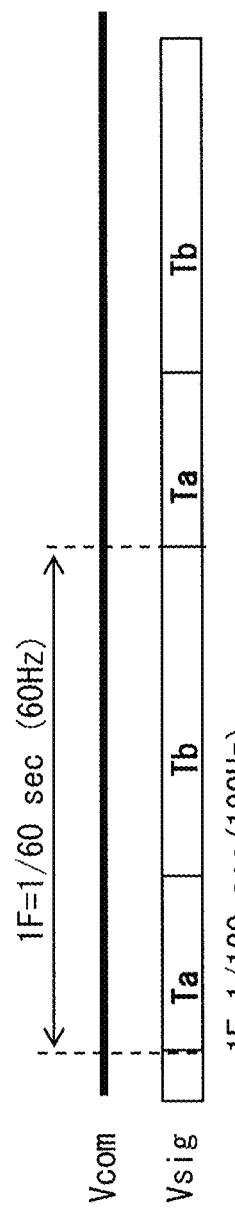
FIGS. 23A, 23B, and 23C are schematic diagrams that describes an example of the effective display period and the blanking period.
Figures 24A, 24B, 24C:
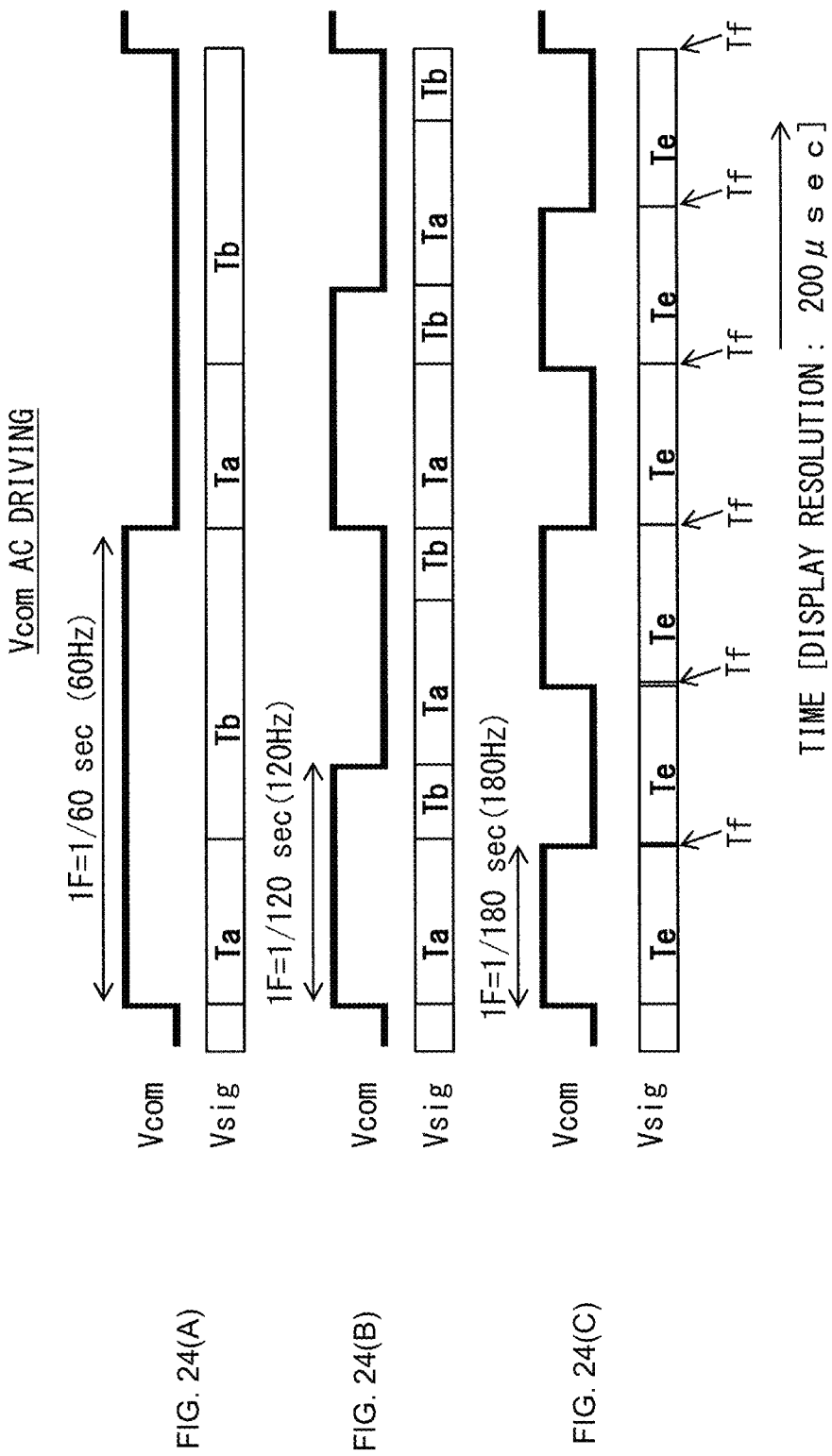
FIGS. 24A, 24B, and 24C are schematic diagrams that describes an example of the effective display period and the blanking period.

For example, in the case where one field period is 1/60 sec, the controller 20 may perform the control of the active matrix driving by the field inversion driving method such that the blanking period Tb subsequent to the effective display period Ta becomes 2/180 sec (2/3 of one field period) or longer, as illustrated in FIG. 23(A) and FIG. 24(A). At this time, in the effective display period Ta, the timing at which the signal voltage Vsig is outputted from the horizontal driving circuit 32 to each of the signal lines Sig may be coincident with, for example, the timing at which the signal voltage Vsig is outputted from the horizontal driving circuit 32 to each of the signal lines Sig in a case where one field period is 1/180 sec and the effective display period Te is substantially equal to one field period (see of FIG. 23(C) and FIG. 24(C)).

Figure 25A:
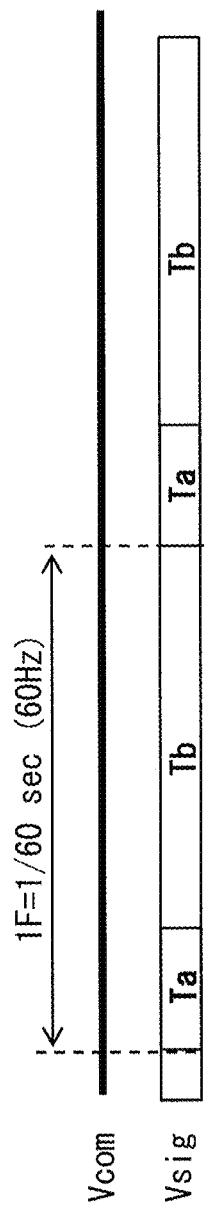
FIGS. 25A, 25B, 25C, and 25D are schematic diagrams that describes an example of the effective display period and the blanking period.
Figures 26A, 26B, 26C, 26D:
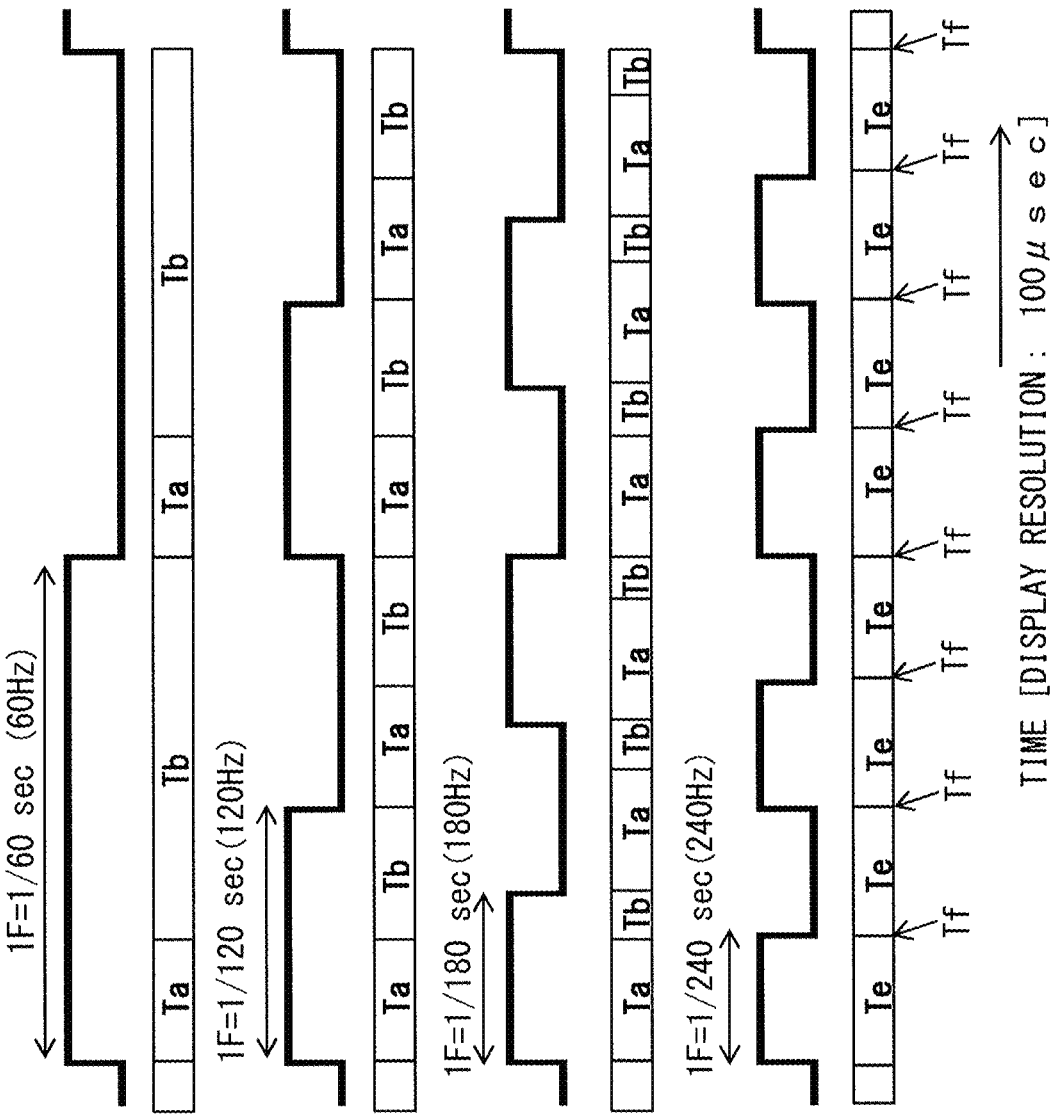
FIGS. 26A, 26B, 26C, and 26D are schematic diagrams that describes an example of the effective display period and the blanking period.

For example, in the case where one field is 1/60 sec, the controller 20 may perform the control of the active matrix driving by the field inversion driving method such that the blanking period Tb subsequent to the effective display period Ta becomes 3/240 sec (3/4 of one field period) or longer, as illustrated in FIG. 25(A) and FIG. 26(A). At this time, in the effective display period Ta, the timing at which the signal voltage Vsig is outputted from the horizontal driving circuit 32 to each of the signal lines Sig may be coincident with, for example, the timing at which the signal voltage Vsig is outputted from the horizontal driving circuit 32 to each of the signal lines Sig in a case where one field period is 1/240 sec and the effective display period Te is substantially equal to one field period (see FIG. 25(D) and FIG. 26(D)).

In a case where one field period is 1/120 sec and the waveform of the signal outputted from the controller 20 is observed with the display resolution of 200 μsec, the controller 20 performs the control of the active matrix driving by the field inversion driving method such that the effective display period Ta is close to the start time of one field period. More specifically, in a case where one field period is 1/120 sec, the controller 20 performs the control of the active matrix driving by the field inversion driving method such that the blanking period Tf subsequent to the effective display period Ta becomes longer than 200 μsec.

Figure 23B:
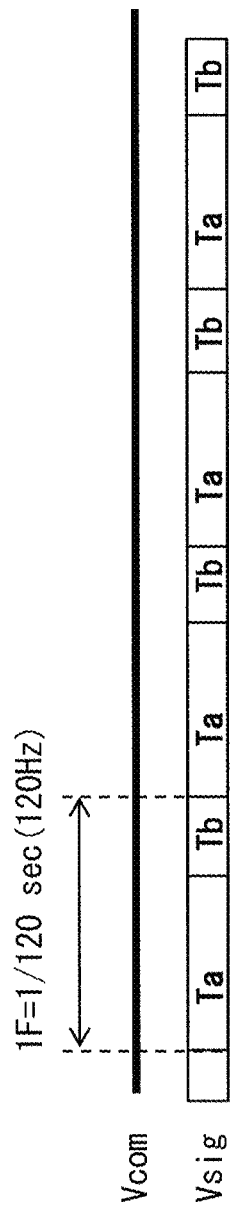
Figure 23C:
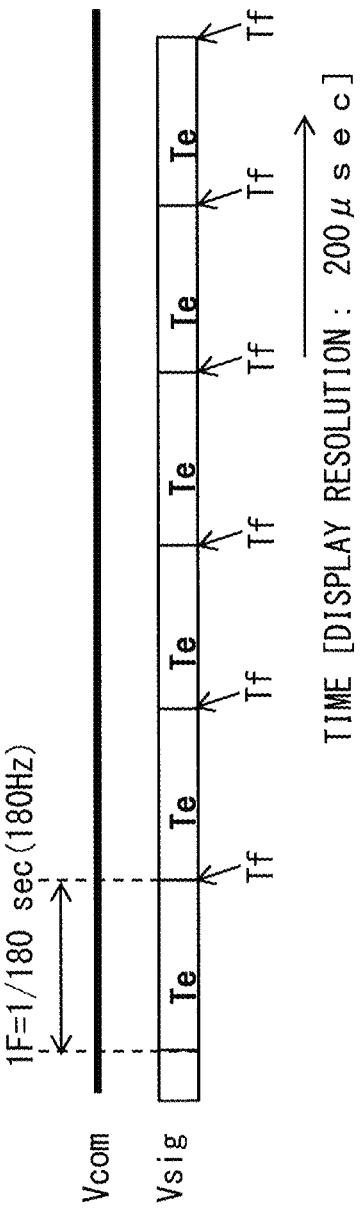

For example, in the case where one field period is 1/120 sec, the controller 20 may perform the control of the active matrix driving by the field inversion driving method such that the blanking period Tb subsequent to the effective display period Ta becomes (1/120 sec-1/180 sec) (1/6 of one field period) or longer, as illustrated in FIG. 23(B) and FIG. 24(B). At this time, in the effective display period Ta, the timing at which the signal voltage Vsig is outputted from the horizontal driving circuit 32 to each of the signal lines Sig may be coincident with, for example, the timing at which the signal voltage Vsig is outputted from the horizontal driving circuit 32 to each of the signal lines Sig in a case where one field period is 1/180 sec and the effective display period Te is substantially equal to one field period (see FIG. 23(C) and FIG. 24(C)).

Figure 25B:
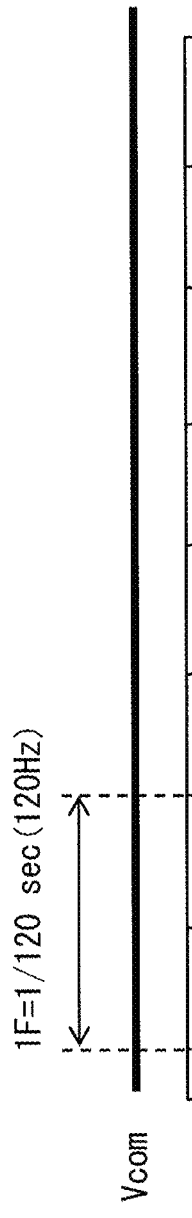

For example, in the case where one field is 1/120 sec, the controller 20 may perform the control of the active matrix driving by the field inversion driving method such that the blanking period Tb subsequent to the effective display period Ta becomes 1/240 sec (1/2 of one field period) or longer, as illustrated in FIG. 25(B) and FIG. 26(B). At this time, in the effective display period Ta, the timing at which the signal voltage Vsig is outputted from the horizontal driving circuit 32 to each of the signal lines Sig may be coincident with, for example, the timing at which the signal voltage Vsig is outputted from the horizontal driving circuit 32 to each of the signal lines Sig in a case where one field period is 1/240 sec and the effective display period Te is substantially equal to one field period (see FIG. 25(D) and FIG. 26(D)).

In the case where one field period is 1/180 sec and the waveform of the signal outputted from the controller 20 is observed with the display resolution of 200 μsec, the controller 20 performs the control of the active matrix driving by the field inversion driving method such that the effective display period Ta is close to the start time of one field period. More specifically, in a case where one field period is 1/180 sec, the controller 20 performs the control of the active matrix driving by the field inversion driving method such that the blanking period Tf in one field period becomes longer than 200 μsec.

Figure 25C:
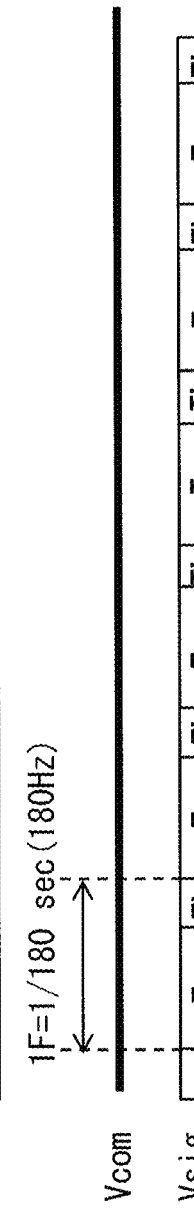
Figure 25D:
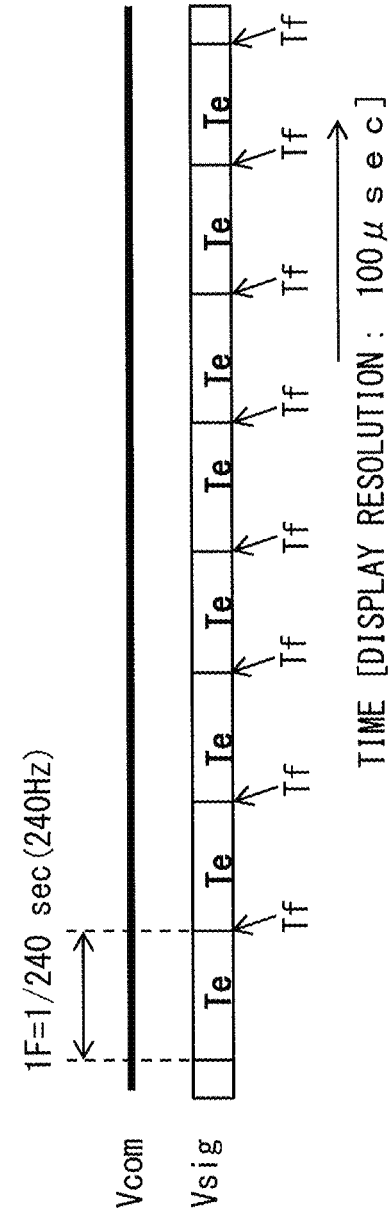

For example, in the case where one field period is 1/180 sec, the controller 20 may perform the control of the active matrix driving by the field inversion driving method such that the blanking period Tb subsequent to the effective display period Ta becomes (1/180 sec-1/240 sec) (1/12 of one field period) or longer, as illustrated in FIG. 25(C) and FIG.

26(C). At this time, in the effective display period Ta, the timing at which the signal voltage Vsig is outputted from the horizontal driving circuit 32 to each of the signal lines Sig may be coincident with, for example, the timing at which the signal voltage Vsig is outputted from the horizontal driving circuit 32 to each of the signal lines Sig in a case where one field period is 1/240 sec and the effective display period Te is substantially equal to one field period (see FIG. 25(D) and FIG. 26(D)).

In a case where one field period is 1/50 sec and the waveform of the signal outputted from the controller 20 is observed with the display resolution of 500 μsec (the display resolution lower than display resolution of 200 μsec), the controller 20 performs the control of the active matrix driving by the field inversion driving method such that the effective display period Ta is close to the start time of one field period. More specifically, in a case where one field period is 1/50 sec, the controller 20 performs the control of the active matrix driving by the field inversion driving method such that the blanking period Tb in one field period becomes longer than 500 μsec.

Figures 27A, 27B:
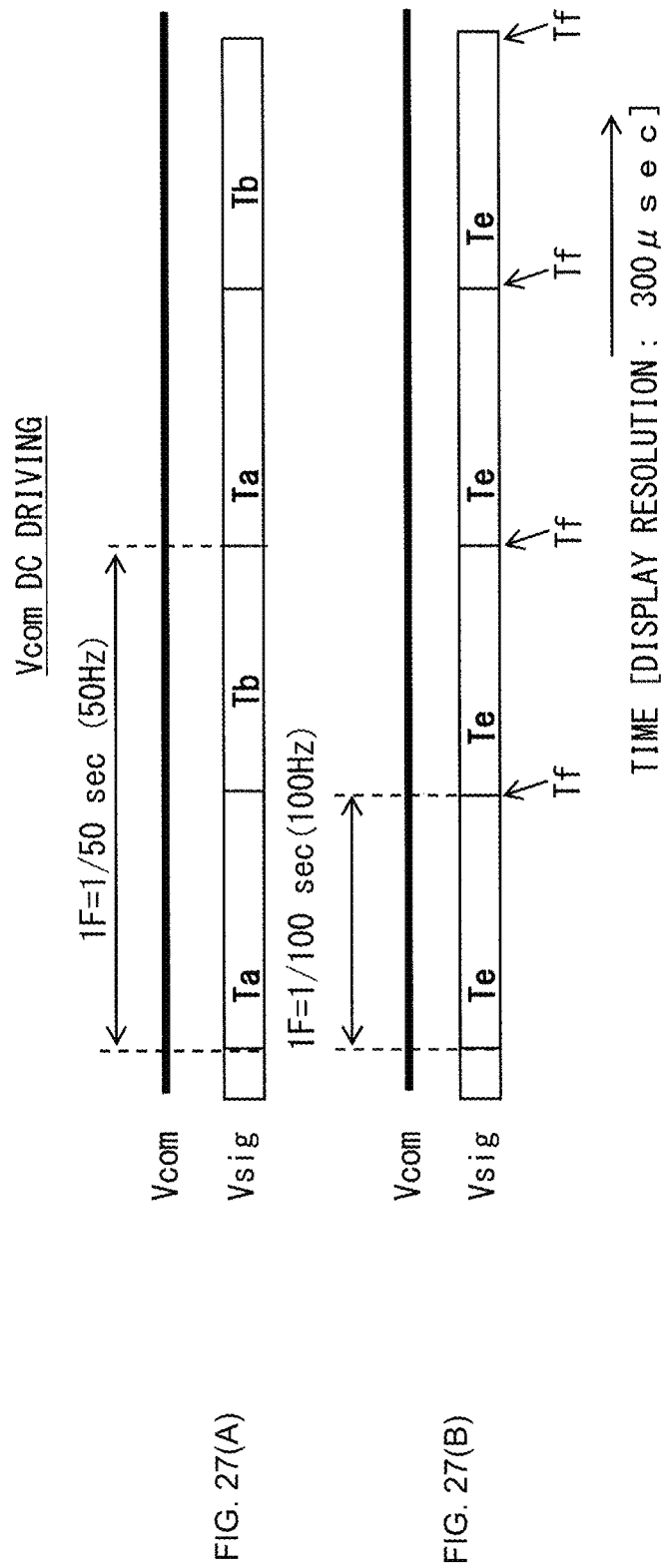
FIGS. 27A and 27B are schematic diagrams that describes an example of the effective display period and the blanking period.

For example, in the case where one field period is 1/50 sec, the controller 20 may perform the control of the active matrix driving by the field inversion driving method such that the blanking period Tb subsequent to the effective display period Ta becomes 1/100 sec (1/2 of one field period) or longer, as illustrated in FIG. 27(A) and FIG. 28(A). At this time, in the effective display period Ta, the timing at which the signal voltage Vsig is outputted from the horizontal driving circuit 32 to each of the signal lines Sig may be coincident with, for example, the timing at which the signal voltage Vsig is outputted from the horizontal driving circuit 32 to each of the signal lines Sig in a case where one field period is 1/100 sec and the effective display period Te is substantially equal to one field period (see FIG. 27(B) and FIG. 28(B)).

Figures 29A, 29B, 29C:
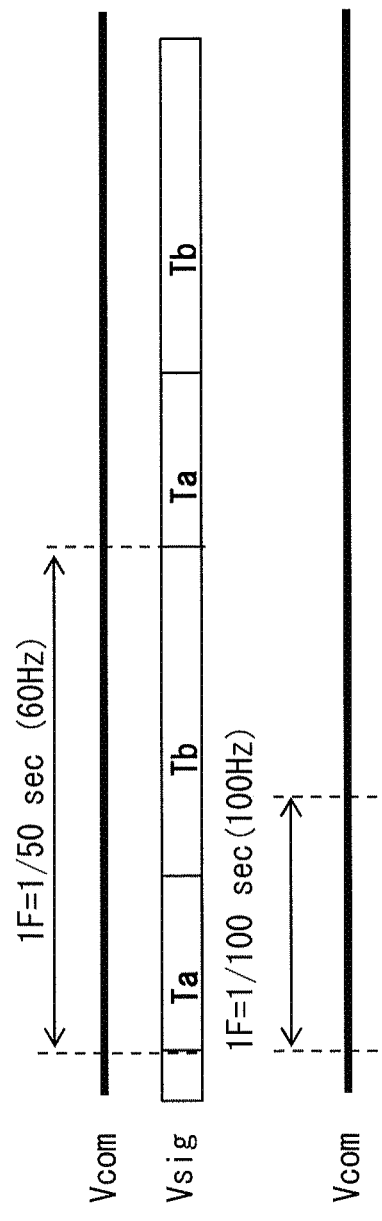
FIGS. 29A, 29B, and 29C are schematic diagrams that describes an example of the effective display period and the blanking period.

For example, in the case where one field period is 1/50 sec, the controller 20 may perform the control of the active matrix driving by the field inversion driving method such that the blanking period Tb subsequent to the effective display period Ta becomes 2/150 sec (2/3 of one field period) or longer, as illustrated in FIG. 29(A) and FIG. 30(A). At this time, in the effective display period Ta, the timing at which the signal voltage Vsig is outputted from the horizontal driving circuit 32 to each of the signal lines Sig may be coincident with, for example, the timing at which the signal voltage Vsig is outputted from the horizontal driving circuit 32 to each of the signal lines Sig in a case where one field period is 1/150 sec and the effective display period Te is substantially equal to one field period (see FIG. 29(C) and FIG. 30(C)).

Figures 32A, 32B, 32C, 32D:
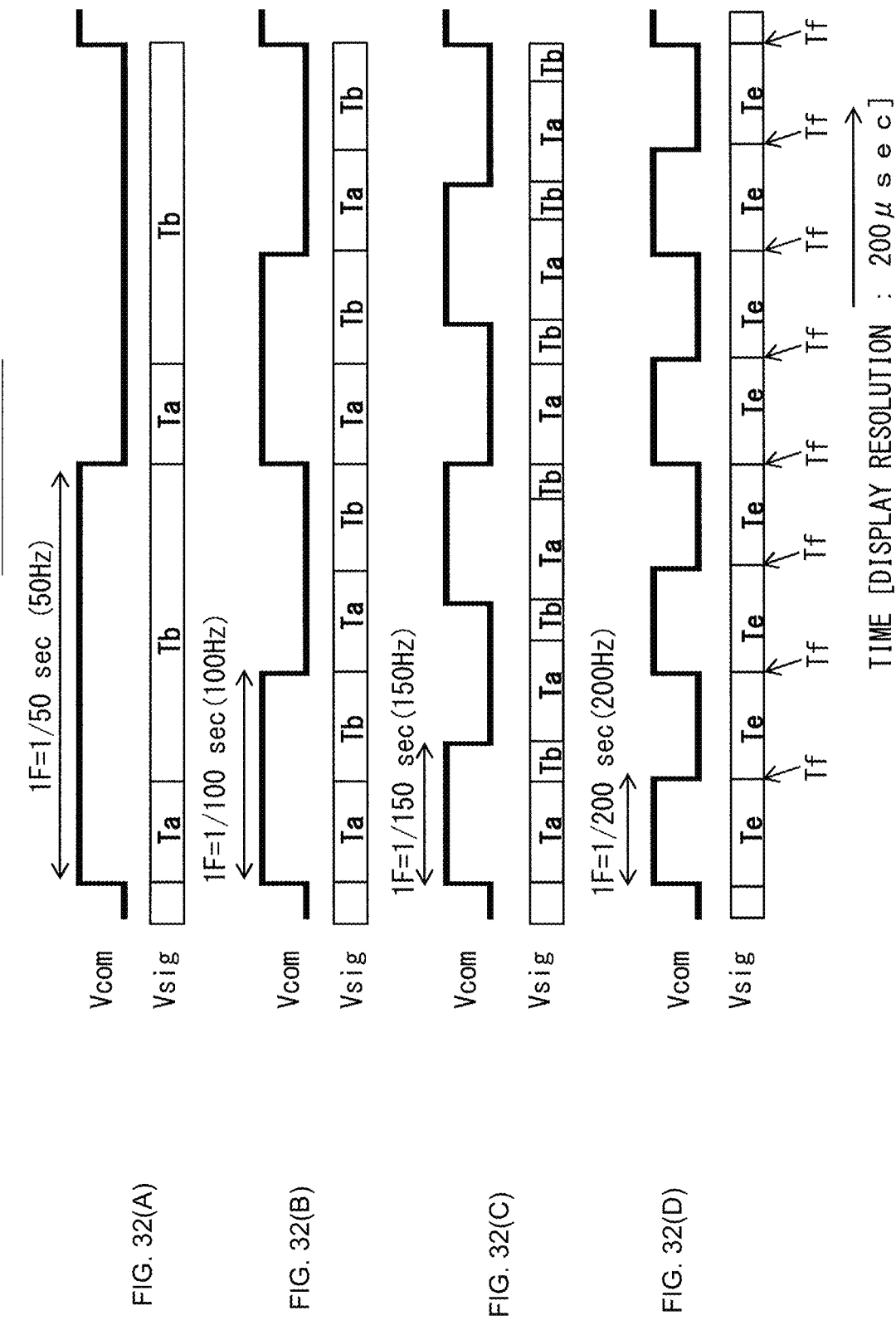
FIGS. 32A, 32B, 32C, and 32D are schematic diagrams that describes an example of the effective display period and the blanking period.

For example, in the case where one field period is 1/50 sec, the controller 20 may perform the control of the active matrix driving by the field inversion driving method such that the blanking period Tb subsequent to the effective display period Ta becomes 3/200 sec (3/4 of one field period) or longer, as illustrated in FIG. 31(A) and FIG. 32(A). At this time, in the effective display period Ta, the timing at which the signal voltage Vsig is outputted from the horizontal driving circuit 32 to each of the signal lines Sig may be coincident with, for example, the timing at which the signal voltage Vsig is outputted from the horizontal driving circuit 32 to each of the signal lines Sig in a case where one field period is 1/200 sec and the effective display period Te is substantially equal to one field period (see FIG. 31(D) and FIG. 32(D)).

In a case where one field period is 1/100 sec and the waveform of the signal outputted from the controller 20 is observed with the display resolution of 300 μsec, the controller 20 performs the control of the active matrix driving by the field inversion driving method such that the effective display period Ta is close to the start time of one field period. More specifically, in a case where one field period is 1/100 sec, the controller 20 performs the control of the active matrix driving by the field inversion driving method such that the blanking period Tf subsequent to the effective display period Ta becomes longer than 300 μsec.

For example, in a case where one field period is 1/100 sec, the controller 20 may perform the control of the active matrix driving by the field inversion driving method such that the blanking period Tb subsequent to the effective display period Ta becomes (1/100 sec-1/150 sec) (1/6 of one field period) or longer, as illustrated in (B) of FIG. 29(B) and FIG. 30(B). At this time, in the effective display period Ta, the timing at which the signal voltage Vsig is outputted from the horizontal driving circuit 32 to each of the signal lines Sig may be coincident with, for example, the timing at which the signal voltage Vsig is outputted from the horizontal driving circuit 32 to each of the signal lines Sig in a case where one field period is 1/150 sec and the effective display period Te is substantially equal to one field period (see FIG. 29(C) and FIG. 30(C)).

For example, in the case where one field period is 1/100 sec, the controller 20 may perform the control of the active matrix driving by the field inversion driving method such that the blanking period Tb subsequent to the effective display period Ta becomes 1/200 sec (1/2 of one field period) or longer, as illustrated in FIG. 31(B) and FIG. 32(B). At this time, in the effective display period Ta, the timing at which the signal voltage Vsig is outputted from the horizontal driving circuit 32 to each of the signal lines Sig may be coincident with, for example, the timing at which the signal voltage Vsig is outputted from the horizontal driving circuit 32 to each of the signal lines Sig in a case where one field period is 1/200 sec and the effective display period Te is substantially equal to one field period (see FIG. 31(D) and FIG. 32(D)).

In a case where one field period is 1/150 sec and the waveform of the signal outputted from the controller 20 is observed with the display resolution of 200 μsec, the controller 20 performs the control of the active matrix driving by the field inversion driving method such that the effective display period Ta is close to the start time of one field period. More specifically, in a case where one field period is 1/150 sec, the controller 20 performs the control of the active matrix driving by the field inversion driving method such that the blanking period Tf in one field period becomes longer than 200 μsec.

For example, in the case where one field period is 1/150 sec, the controller 20 may perform the control of the active matrix driving by the field inversion driving method such that the blanking period Tb subsequent to the effective display period Ta becomes (1/150 sec-1/200 sec) (1/12 of one field period) or longer, as illustrated in FIG. 31(C) and FIG. 32(C). At this time, in the effective display period Ta, the timing at which the signal voltage Vsig is outputted from the horizontal driving circuit 32 to each of the signal lines Sig may be coincident with, for example, the timing at which the signal voltage Vsig is outputted from the horizontal driving circuit 32 to each of the signal lines Sig in a case where one field period is 1/200 sec and the effective display period Te is substantially equal to one field period (see FIG. 31(D) and FIG. 32(D)).

As described above, in the present embodiment, in a case where the waveform of the signal outputted from the controller 20 is observed with the predetermined display resolution corresponding to the length of one field period, the control of the active matrix driving is performed by the field inversion driving method such that the effective display period Ta in one field period is close to the start time of one field period. As a result, the radio of the blanking period Tf to the effective display period Ta becomes extremely large as compared with the comparative example. Therefore, the polarity of the signal voltage Vsig with respect to the common voltage Vcom is changed from negative to positive after a certain time elapses after the desired pixel voltage Vpix is applied to the lowermost pixels 11, which significantly decreases the difference in the leakage period and the difference in the leakage amount among the top, the middle, and the bottom of the screen, as compared with the comparative example. As a result, for example, as illustrated in FIG. 18, a region where shading and a mottled pattern occur shifts toward the bottom of the screen to extent intuitively recognized by a user, as compared with the comparative example. Further, the shading and the mottled pattern become inconspicuous to extent intuitively recognized by the user, as compared with the comparative example. Accordingly, in the present embodiment, it is possible to significantly suppress deterioration of image quality caused by the current leakage in the field inversion driving.

Further, in the present embodiment, in a case where the controller 20 performs the control of the active matrix driving by the field inversion driving method such that the blanking period Tb in one field period becomes a period of msec order, the region where shading and a mottled pattern occur is substantially eliminated, for example, as illustrated in FIG. 33. Therefore, in the present embodiment, in the case where the control of the active matrix driving is performed by the field inversion driving method such that the blanking period Tb in one field period becomes a period of msec order, it is possible to substantially eliminate deterioration of image quality caused by the current leakage in the field inversion driving.

2. Modifications of First Embodiment

[Modification A]

Figure 34A:
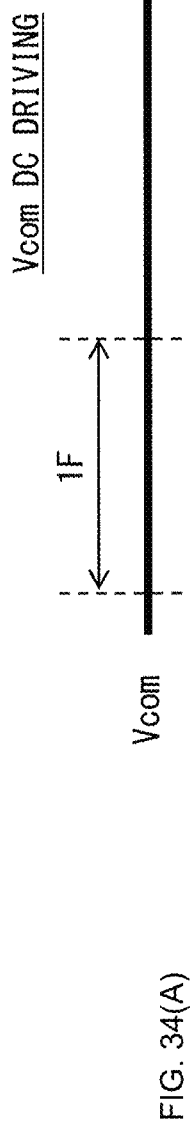
FIGS. 34A and 34B are schematic diagrams that describes an example of the effective display period and the blanking period.
Figure 34B:
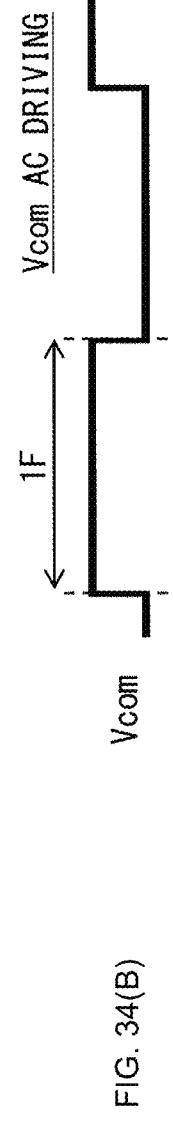

In the above-described embodiment, only one effective display period Ta is provided in one field period. For example, in a case where the effective display period Ta is shorter than ½ of one field period as illustrated in FIGS. 34A and 34B, two effective display periods Ta may be provided in one field period. In the present modification, however, the controller 20 performs the control of the active matrix driving by the field inversion driving method such that the two effective display periods Ta in one field period are close to the start time of one field period in a case where the waveform of the signal outputted from the controller 20 is observed with predetermined display resolution corresponding to the length of one field period.

[Modification B]

FIG. 35 illustrates a modification of the schematic configuration of the display device 1 according to the above-described embodiment. FIG. 36 illustrates an example of a schematic configuration of the display panel module 40 in the present modification. In the present modification, the liquid crystal driver 30 further includes a precharge circuit 33. The precharge circuit 33 generates a precharge signal (a predetermined voltage) to precharge the pixel array section 10, and applies the precharge signal to the pixel array section 10. The precharge circuit 33 is provided on the substrate 41 of the display panel module 40.

FIG. 37 and FIG. 38 illustrate an example of the circuit configuration of the horizontal driving circuit 32 and the precharge circuit 33. The precharge circuit 33 is coupled, together with the horizontal driving circuit 32, to each of the signal lines Sig. Note that, in FIGS. 31A, 31B, 31C, and 31D, the precharge circuit 33 is coupled, together with the horizontal driving circuit 32 illustrated in FIG. 3, to each of the signal lines Sig. In FIGS. 32A, 32B, 32C, and 32D, the precharge circuit 33 is coupled, together with the horizontal driving circuit 32 illustrated in FIG. 4, to each of the signal lines Sig.

The precharge circuit operates on the basis of a control signal supplied from the controller 20, and outputs a precharge signal voltage Vpsig to the pixel array section 10 through the signal lines Sig in parallel. For example, the precharge signal voltage Vpsig includes a precharge signal voltage VpsigB, a precharge signal voltage VpsigG1, and a precharge signal voltage VpsigG2, as illustrated in FIG. 39. The precharge signal voltage VpsigB is a signal voltage to reduce variation of the voltage of the counter electrode in each of the pixels 11, and has a fixed value irrespective of the magnitude and the polarity of the signal voltage Vsig. The precharge signal voltages VpsigG1 and VpsigG2 are signal voltages outputted subsequent to the precharge signal voltage VpsigB. The precharge signal voltage VpsigG1 is a signal voltage outputted immediately before the signal voltage Vsig is outputted in a case where the polarity of the signal voltage Vsig is positive. The precharge signal voltage VpsigG1 has a voltage value slightly lower than the voltage value of the signal voltage Vsig. The precharge signal voltage VpsigG2 is a signal voltage outputted immediately before the signal voltage Vsig is outputted in a case where the polarity of the signal voltage Vsig is negative. The precharge signal voltage VpsigG2 has a voltage value slightly higher than the voltage value of the signal voltage Vsig.

In the present modification, the precharge signal voltages VpsigB and VpsigG1 or the precharge signal voltages VpsigB and VpsigG2 are applied immediately before the signal voltage Vsig is applied. This makes it possible to reduce variation of the pixel voltage Vpix in each of the pixels 11, which allows for suppression of occurrence of shading.

3. Second Embodiment

Next, an electronic apparatus 2 according to a second embodiment of the technology is described. FIG. 40 illustrates a perspective configuration example of the electronic apparatus 2 according to the present embodiment. The electronic apparatus 2 is, for example, a mobile terminal including a display surface 2A on a main surface of a plate-like housing. The electronic apparatus 2 corresponds to a specific example of an "electronic apparatus" in the technology. The electronic apparatus 2 includes the display device 1 according to any of the above-described embodiment and modifications, for example, at a position of the display surface 2A. Since the display device 1 is provided, the present embodiment achieves effects similar to the effects of the above-described first embodiment.

4. Third Embodiment

Next, an electronic apparatus 3 according to a third embodiment of the technology is described. FIG. 41 illustrates a schematic configuration example of the electronic apparatus 3 according to the present embodiment. The electronic apparatus 3 is, for example, a notebook personal computer that includes a display surface 3A on a main surface of one of two plate-like foldable housings. The electronic apparatus 3 corresponds to a specific example of an "electronic apparatus" in the technology. The electronic apparatus 3 includes the display device 1 according to any of the above-described embodiment and modifications, for example, at a position of the display surface 3A. Since the display device 1 is provided, the present embodiment achieves effects similar to the effects of the above-described first embodiment.

5. Fourth Embodiment

[Configuration]

Next, a projector 4 according to a fourth embodiment of the technology is described. The projector 4 corresponds to a specific example of a "projection display apparatus" in the technology. FIG. 42 illustrates a schematic surface configuration example of the projector 4 according to the fourth embodiment of the technology. The projector 4 includes, for example, a light source unit 5, an image generation system 6, and a projection optical system 7.

The image generation system 6 modulates light (for example, white light) emitted from the light source unit 5, on the basis of an image signal, to generate image light of a plurality of colors, synthesizes the generated image light of the plurality of colors, and then outputs the synthesized light to the projection optical system 7. The image generation system 6 includes an illumination optical system 610, an image generator 620, and an image synthesizer 630. The projection optical system 7 projects the image light (the synthesized image light) outputted from the image generation system 6 to a screen, etc. The image generation system 6 corresponds to a specific example of a "light modulator" in the technology. The projection optical system 7 corresponds to a specific example of a "projection section" in the technology.

The illumination optical system 610 separates the light (for example, white light) emitted from the light source unit 5 into light of a plurality of colors. For example, the illumination optical system 610 includes an integrator element 611, a polarization converter 612, a condenser lens 613, dichroic mirrors 614 and 615, and mirrors 616 to 618. The integrator element 611 includes, for example, a fly-eye lens 611a and a fly-eye lens 611b. The fly-eye lens 611a includes a plurality of microlenses that are two-dimensionally arranged. The fly-eye lens 611b also includes a plurality of microlenses that are two-dimensionally arranged. The fly-eye lens 611a divides the light (for example, white light) emitted from the light source unit 5 into a plurality of light fluxes, and causes an image of each of the light fluxes to be formed on each of the microlenses of the fly-eye lens 611b. The fly-eye lens 611b functions as a secondary light source and causes a plurality of parallel light beams with uniform luminance to enter the polarization converter 612. The dichroic mirrors 614 and 615 each selectively reflect color light of a predetermined wavelength range, and allow light of other wavelength ranges to pass therethrough. The dichroic mirror 614 selectively reflects, for example, red light. The dichroic mirror 615 selectively reflects, for example, green light.

The image generator 620 modulates the light of the respective colors separated by the illumination optical system 610, and generates the image light of the respective colors, on the basis of image signals corresponding to the respective colors provided from outside. The image generator 620 includes, for example, a red light valve 621, a green light valve 622, and a blue light valve 623. The red light valve 621 modulates the red light provided from the illumination optical system 610 to generate red image light, on the basis of the image signal that corresponds to red and is provided from outside. The green light valve 622 modulates the green light provided from the illumination optical system 610 to generate green image light, on the basis of the image signal that corresponds to green and is provided from outside. The blue light valve 623 modulates the blue light provided from the illumination optical system 610 to generate blue image light, on the basis of the image signal that corresponds to blue and is provided from outside. Each of the red light valve 621, the green light valve 622, and the blue light valve 623 includes the display device 1 according to any of the above-described embodiment and modifications.

The image synthesizer 630 synthesizes the image light of the respective colors generated by the image generator 620, thereby generating color image light.

[Effects]

Next, effects of the projector 4 according to the present embodiment are described.

In the present embodiment, the display device 1 according to any of the above-described embodiment and modifications is used as the red light valve 621, the green light valve 622, and the blue light valve 623. Since the display device 1 is provided, the projector 4 achieves effects similar to the effects of the above-described first embodiment.

Hereinbefore, although the technology has been described with reference to four embodiments and modifications thereof, the technology is not limited to the above-described embodiments, and various modifications may be made. Note that the effects described in the present specification are illustrative and non-limiting. The effects of the technology are not limited to those described in the present specification. The technology may achieve effects other than those described in the present specification.

Further, the technology may have the following configurations.

(1)

A control circuit that controls driving of an electrooptical element, the control circuit performing control of active matrix driving by a field inversion driving method to cause a vertical effective display period in one field period to be close to a start time of the one field period upon observation of a waveform of a signal outputted from the control circuit with display resolution of 200 μsec or display resolution lower than display resolution of 200 μsec, the one field period being defined by a vertical start signal.

(2)

The control circuit according to (1), in which the control circuit performs control of field inversion driving to apply, to the electrooptical element, a signal voltage that is inverted in polarity with respect to a common voltage of the electrooptical element for each field period.

(3)

The control circuit according to (2), in which the control circuit performs the control of the field inversion driving to vary the common voltage for each field period.

(4)

The control circuit according to (2), in which the control circuit performs the control of the field inversion driving while fixing a potential of the common voltage.

(5)
The control circuit according to any one of (1) to (4), in which the vertical blanking period is ½ of the one field period or longer.
(6)
The control circuit according to any one of (1) to (4), in which the vertical blanking period is ⅔ of the one field period or longer.
(7)
The control circuit according to any one of (1) to (4), in which the vertical blanking period is ¾ of the one field period or longer.
(8)
The control circuit according to any one of (1) to (4), in which the vertical blanking period is ⅙ of the one field period or longer.
(9)
The control circuit according to any one of (1) to (4), in which the vertical blanking period is 1/12 of the one field period or longer.
(10)
The control circuit according to any one of (1) to (9), in which the one field period includes only one vertical effective display period.
(11)
The control circuit according to any one of (1) to (10), in which
the vertical effective display period has a length shorter than ½ of the one field period, and
the one field period includes only two vertical effective display periods.
(12)
A display device, including:
an electrooptical element; and
a control circuit that controls driving of the electrooptical element, in which
the control circuit performs control of active matrix driving by a field inversion driving method to cause a vertical effective display period in one field period to be close to a start time of the one field period upon observation of a waveform of a signal outputted from the control circuit with display resolution of 200 μsec or display resolution lower than display resolution of 200 μsec, the one field period being defined by a vertical start signal.
(13)
The display device according to (12), in which
the electrooptical element includes
a plurality of scan lines extending in a row direction,
a plurality of signal lines extending in a column direction,
a plurality of pixels being provided one by one at respective intersections of the scan lines and the signal lines,
a vertical driving circuit being coupled to the plurality of scan lines, and
a horizontal driving circuit being coupled to the plurality of signal lines,
each of the pixels includes
a liquid crystal cell, and
a pixel transistor that samples a voltage of the corresponding signal line and writes the voltage into the liquid crystal cell, on a basis of a signal provided from the corresponding scan lines, and
the control circuit performs the control of the active matrix driving on the vertical driving circuit and the horizontal driving circuit by the field inversion driving method of the pixels.

(14)
An electronic apparatus provided with a display device, the display device including:
an electrooptical element; and
a control circuit that controls driving of the electrooptical element, in which
the control circuit performs control of active matrix driving by a field inversion driving method to cause a vertical effective display period in one field period to be close to a start time of the one field period upon observation of a waveform of a signal outputted from the control circuit with display resolution of 200 μsec or display resolution lower than display resolution of 200 μsec, the one field period being defined by a vertical start signal.
(15)
A projection display apparatus, including:
an illumination optical system;
a plurality of electrooptical elements that modulate light from the illumination optical system to generate image light;
a control circuit that controls driving of the plurality of electrooptical elements; and
a projection optical system that projects the image light generated by the plurality of electrooptical elements, in which
the control circuit performs control of active matrix driving by a field inversion driving method to cause a vertical effective display period in one field period to be close to a start time of the one field period upon observation of a waveform of a signal outputted from the control circuit with display resolution of 200 μsec or display resolution lower than display resolution of 200 μsec, the one field period being defined by a vertical start signal.

This application is based upon and claims the benefit of priority of the Japanese Patent Application No. 2015-128929 filed with the Japan Patent Office on Jun. 26, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. A control circuit, comprising:
circuitry configured to:
control an electrooptical element;
generate a signal, wherein a display resolution of a waveform of the generated signal is 200 μsec or lower than 200 μsec;
apply a common voltage in synchronization with a vertical start signal (VST) to the electrooptical element;
control an active matrix by a field inversion driving method, wherein
a vertical effective display period in each of a plurality of field periods of the generated signal starts from a start time of a corresponding field period of the plurality of field periods,
a vertical blanking period in each of the plurality of field periods ends at an end time of the corresponding field period of the plurality of field periods,
the start time of the corresponding field period of the plurality of field periods starts from a rising time of the common voltage of the electrooptical element and the end time of the corresponding field period of the plurality of field periods ends at a falling time of the common voltage, the start time of the corresponding field period of the plurality of field periods starts from a first rising time of the VST and the end time of the corresponding field period of the plurality of field periods ends at a second rising time of the VST, and the second rising time of the VST is subsequent to the first rising time of the VST;

vary the common voltage of the electrooptical element for each of the plurality of field periods;

apply a signal voltage to the electrooptical element for each of the plurality of field periods;

apply a pixel voltage to specific pixels of the electrooptical element;

invert a polarity of the applied signal voltage with respect to the common voltage after an elapse of a specific time from the application of the pixel voltage; and output a precharge signal voltage to the electrooptical element for reduction in variation of the pixel voltage, wherein when a polarity of the signal voltage is positive, a first value of the precharge signal voltage is outputted before the application of the signal voltage, when the polarity of the signal voltage is negative, a second value of the precharge signal voltage is outputted before the application of the signal voltage, the first value of the precharge signal voltage is lower than a first value of the signal voltage, and the second value of the precharge signal voltage is higher than a second value of the signal voltage.

2. The control circuit according to claim 1, wherein the vertical blanking period is at least ½ of the corresponding field period.

3. The control circuit according to claim 1, wherein the vertical blanking period is at least ⅔ of the corresponding field period.

4. The control circuit according to claim 1, wherein the vertical blanking period is at least ¾ of the corresponding field period.

5. The control circuit according to claim 1, wherein the vertical blanking period is at least ⅙ of the corresponding field period.

6. The control circuit according to claim 1, wherein the vertical blanking period is at least 1/12 of the corresponding field period.

7. The control circuit according to claim 1, wherein the vertical effective display period has a length shorter than ½ of the corresponding field period, and each of the plurality of field periods includes two vertical effective display periods.

8. A display device, comprising:
an electrooptical element that includes a plurality of pixels; and
a control circuit configured to:
control the electrooptical element;
generate a signal, wherein a display resolution of a waveform of the generated signal is 200 µsec or lower than 200 µsec;
apply a common voltage in synchronization with a vertical start signal (VST) to the electrooptical element;
control an active matrix by a field inversion driving method, wherein
a vertical effective display period in each of a plurality of field periods of the generated signal starts from a start time of a corresponding field period of the plurality of field periods, a vertical blanking period in each of the plurality of field periods ends at an end time of the corresponding field period of the plurality of field periods, the start time of the corresponding field period of the plurality of field periods starts from a rising time of the common voltage of the electrooptical element and the end time of the corresponding field period of the plurality of field periods ends at a falling time of the common voltage of the electrooptical element, the start time of the corresponding field period of the plurality of field periods starts from a first rising time of the VST and the end time of the corresponding field period of the plurality of field periods ends at a second rising time of the VST, and the second rising time of the VST is subsequent to the first rising time of the VST;

vary the common voltage of the electrooptical element for each of the plurality of field periods;

apply a signal voltage to the electrooptical element for each of the plurality of field periods;

apply a pixel voltage to specific pixels of the plurality of pixels of the electrooptical element;

invert a polarity of the applied signal voltage with respect to the common voltage after an elapse of a specific time from the application of the pixel voltage; and output a precharge signal voltage to the electrooptical element for reduction in variation of the pixel voltage, wherein when a polarity of the signal voltage is positive, a first value of the precharge signal voltage is outputted before the application of the signal voltage, when the polarity of the signal voltage is negative, a second value of the precharge signal voltage is outputted before the application of the signal voltage, the first value of the precharge signal voltage is lower than a first value of the signal voltage, and the second value of the precharge signal voltage is higher than a second value of the signal voltage.

9. The display device according to claim 8, wherein the electrooptical element further includes:
a plurality of scan lines that extends in a row direction;
a plurality of signal lines that extends in a column direction, wherein the plurality of pixels is at respective intersections of the plurality of scan lines and the plurality of signal lines;
a vertical driving circuit coupled to the plurality of scan lines; and
a horizontal driving circuit coupled to the plurality of signal lines,
each of the plurality of pixels includes:
a liquid crystal cell; and
a pixel transistor configured to:
sample a voltage of a specific signal line of the plurality of signal lines; and
write the voltage into the liquid crystal cell based on a signal from a specific scan line of the plurality of scan lines,
the specific signal line and the specific scan line correspond to the pixel transistor, and the control circuit is further configured to control the vertical driving circuit and the horizontal driving circuit based on the field inversion driving method of the plurality of pixels.

10. An electronic apparatus, comprising:
a display device that comprises:
an electrooptical element; and
a control circuit configured to:
control the electrooptical element;
generate a signal, wherein a display resolution of a waveform of the generated signal is 200 μsec or lower than 200 μsec;
apply a common voltage in synchronization with a vertical start signal (VST) to the electrooptical element;
control an active matrix by a field inversion driving method, wherein
a vertical effective display period in each of a plurality of field periods of the generated signal starts from a start time of a corresponding field period of the plurality of field periods,
a vertical blanking period in each of the plurality of field periods ends at an end time of the corresponding field period of the plurality of field periods,
the start time of the corresponding field period of the plurality of field periods starts from a rising time of the common voltage of the electrooptical element and the end time of the corresponding field period of the plurality of field periods ends at a falling time of the common voltage of the electrooptical element,
the start time of the corresponding field period of the plurality of field periods starts from a first rising time of the VST and the end time of the corresponding field period of the plurality of field periods ends at a second rising time of the VST, and
the second rising time of the VST is subsequent to the first rising time of the VST;
vary the common voltage of the electrooptical element for each of the plurality of field periods;
apply a signal voltage to the electrooptical element for each of the plurality of field periods;
apply a pixel voltage to specific pixels of the electrooptical element;
invert a polarity of the applied signal voltage with respect to the common voltage after an elapse of a specific time from the application of the pixel voltage; and
output a precharge signal voltage to the electrooptical element for reduction in variation of the pixel voltage, wherein
when a polarity of the signal voltage is positive, a first value of the precharge signal voltage is outputted before the application of the signal voltage,
when the polarity of the signal voltage is negative, a second value of the precharge signal voltage is outputted before the application of the signal voltage,
the first value of the precharge signal voltage is lower than a first value of the signal voltage, and
the second value of the precharge signal voltage is higher than a second value of the signal voltage.

11. A projection display apparatus, comprising:
an illumination optical system;
a plurality of electrooptical elements configured to modulate light from the illumination optical system to generate image light;
a projection optical system configured to project the image light generated by the plurality of electrooptical elements; and
a control circuit configured to:
control the plurality of electrooptical elements;
generate a signal for each of the plurality of electrooptical elements, wherein a display resolution of a waveform of the generated signal is 200 μsec or lower than 200 μsec;
apply a corresponding common voltage in synchronization with a vertical start signal (VST) to each of the plurality of electrooptical elements;
control an active matrix for each of the plurality of electrooptical elements by a field inversion driving method, wherein for each of the plurality of electrooptical elements,
a vertical effective display period in each of a plurality of field periods of the generated signal starts from a start time of a corresponding field period of the plurality of field periods,
a vertical blanking period in each of the plurality of field periods ends at an end time of the corresponding field period of the plurality of field periods,
the start time of the corresponding field period of the plurality of field periods starts from a rising time of the corresponding common voltage of each of the plurality of electrooptical elements and the end time of the corresponding field period of the plurality of field periods ends at a falling time of the corresponding common voltage of each of the plurality of electrooptical elements,
the start time of the corresponding field period of the plurality of field periods starts from a first rising time of the VST and the end time of the corresponding field period of the plurality of field periods ends at a second rising time of the VST, and
the second rising time of the VST is subsequent to the first rising time of the VST;
vary the corresponding common voltage of each of the plurality of electrooptical elements for each of the plurality of field periods;
apply a signal voltage to each of the plurality of electrooptical elements for each of the plurality of field periods;
apply a pixel voltage to specific pixels of each of the plurality of electrooptical elements;
invert a polarity of the applied signal voltage with respect to the corresponding common voltage of each of the plurality of electrooptical elements after an elapse of a specific time from the application of the pixel voltage; and
output a precharge signal voltage to each of the plurality of electrooptical elements for reduction in variation of the pixel voltage, wherein
when a polarity of the signal voltage is positive, a first value of the precharge signal voltage is outputted before the application of the signal voltage,
when the polarity of the signal voltage is negative, a second value of the precharge signal voltage is outputted before the application of the signal voltage, the first value of the precharge signal voltage is lower than a first value of the signal voltage, and
the second value of the precharge signal voltage is higher than a second value of the signal voltage.

* * * * *